(12) United States Patent
Madson et al.

(10) Patent No.: US 10,195,486 B2
(45) Date of Patent: Feb. 5, 2019

(54) GOLF BALL HAVING DIMPLES WITH CONCENTRIC OR NON-CONCENTRIC GROOVES

(71) Applicant: Acushnet Company, Fairhaven, MA (US)

(72) Inventors: Michael R. Madson, Easton, MA (US); Nicholas M. Nardacci, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/651,184

(22) Filed: Jul. 17, 2017

(65) Prior Publication Data

US 2017/0312584 A1 Nov. 2, 2017

Related U.S. Application Data

(63) Continuation-in-part of application No. 14/985,792, filed on Dec. 31, 2015, now Pat. No. 9,707,451.

(51) Int. Cl.

| A63B 37/00 | (2006.01) |
|---|---|
| A63B 37/12 | (2006.01) |
| B29C 45/14 | (2006.01) |
| A63B 45/00 | (2006.01) |
| B29L 31/54 | (2006.01) |

(52) U.S. Cl.
CPC ........ *A63B 37/0015* (2013.01); *A63B 37/001* (2013.01); *A63B 37/002* (2013.01); *A63B 37/0006* (2013.01); *A63B 37/0011* (2013.01); *A63B 37/0021* (2013.01); *A63B 37/12* (2013.01); *B29C 45/14073* (2013.01); *A63B 37/00* (2013.01); *A63B 45/00* (2013.01); *B29L 2031/54* (2013.01)

(58) Field of Classification Search
CPC .............. A63B 37/0015; A63B 37/001; A63B 37/0011; A63B 37/002; A63B 37/0021; A63B 37/0006; A63B 37/12; A63B 37/00
See application file for complete search history.

(56) References Cited

U.S. PATENT DOCUMENTS

| 5,566,943 | A | 10/1996 | Boehm ........................ 473/384 |
|---|---|---|---|
| 6,066,055 | A | 5/2000 | Nishino ........................ 473/384 |
| 6,475,106 | B1 * | 11/2002 | Green ................ A63B 37/0004 473/378 |
| 6,729,976 | B2 | 5/2004 | Bissonnette et al. ......... 473/383 |

(Continued)

OTHER PUBLICATIONS

Non-Final Office Action dated Dec. 7, 2016 of corresponding U.S. Appl. No. 14/985,792.

(Continued)

*Primary Examiner* — John E Simms, Jr.
(74) *Attorney, Agent, or Firm* — Mandi B. Milbank

(57) ABSTRACT

The present invention is directed to golf balls having improved aerodynamic performance due, at least in part, to the alteration of the dimple surfaces. In particular, the present invention relates to a golf ball that includes at least a portion of its dimples having circular perimeters and dimple profiles having a concentric groove or a non-concentric groove on the surface of the dimple. The golf ball dimples of the present invention provide golf ball surfaces having unique appearances, while maintaining ideal aerodynamic characteristics.

14 Claims, 20 Drawing Sheets

(56) References Cited

U.S. PATENT DOCUMENTS

| | | | |
|---|---|---|---|
| 6,796,912 B2 | 9/2004 | Dalton et al. | 473/383 |
| 7,041,013 B2 | 5/2006 | Ohama et al. | 473/384 |
| 7,250,012 B1* | 7/2007 | Simonds | A63B 37/0004 473/383 |
| 7,273,426 B2 | 9/2007 | Sato et al. | 473/383 |
| 7,326,131 B2 | 2/2008 | Sajima et al. | 473/383 |
| 7,354,359 B2 | 4/2008 | Sajima | 483/383 |
| 7,503,857 B2 | 3/2009 | Kasashima et al. | 473/383 |
| 7,601,080 B2* | 10/2009 | Olson | A63B 37/0007 473/384 |
| 7,618,332 B2 | 11/2009 | Sato et al. | 473/383 |
| 7,887,439 B2 | 2/2011 | Aoyama et al. | 473/383 |
| 8,591,355 B2 | 11/2013 | Sullivan | 473/383 |
| 8,632,426 B2 | 1/2014 | Madson et al. | 473/383 |
| 9,713,746 B2* | 7/2017 | Hixenbaugh | A63B 37/0019 |
| 2002/0165044 A1* | 11/2002 | Sullivan | A63B 37/0004 473/378 |
| 2004/0185966 A1 | 9/2004 | Endo | 473/383 |
| 2006/0116222 A1 | 6/2006 | Sajima | 473/383 |
| 2009/0111613 A1 | 4/2009 | Sato | 473/383 |
| 2012/0165130 A1 | 6/2012 | Madson et al. | 473/384 |
| 2013/0005509 A1 | 1/2013 | Nakamura | 473/383 |
| 2013/0172123 A1 | 7/2013 | Nardacci et al. | 473/383 |
| 2014/0135147 A1 | 5/2014 | Madson et al. | 473/383 |
| 2015/0119171 A1 | 4/2015 | Madson et al. | |
| 2016/0067552 A1* | 3/2016 | Hixenbaugh | A63B 37/0015 473/383 |
| 2016/0184644 A1 | 6/2016 | Sato | 473/383 |
| 2016/0339302 A1* | 11/2016 | Nardacci | A63B 37/0015 |

OTHER PUBLICATIONS

Notice of Allowance dated Mar. 28, 2017 of corresponding U.S. Appl. No. 14/985,792.

* cited by examiner

GOLF BALL HAVING DIMPLES WITH CONCENTRIC OR NON-CONCENTRIC GROOVES

FIELD OF THE INVENTION

The present invention relates to golf ball dimples having concentric grooves or non-concentric grooves on the dimple surface. In particular, the present invention relates to golf ball dimples having circular perimeters and dimple profiles having a concentric or non-concentric groove on the surface of the dimple. When utilized on golf balls, the golf ball dimples of the present invention provide surfaces having unique appearances, while maintaining ideal aerodynamic characteristics.

BACKGROUND OF THE INVENTION

Golf balls generally include a spherical outer surface with a plurality of dimples formed thereon. The dimples on a golf ball improve the aerodynamic characteristics of a golf ball and, therefore, golf ball manufacturers have researched dimple patterns, shape, volume, and cross-section in order to improve the aerodynamic performance of a golf ball. Determining specific dimple arrangements and dimple shapes that result in an aerodynamic advantage requires an understanding of how a golf ball travels through air.

As a threshold matter, a ball without dimples encounters no turbulence in the thin layer of air that flows close to the surface of a golf ball (i.e., the boundary layer). When a ball includes a number of dimples on the surface, the boundary layer becomes turbulent, which moves the separation point, i.e., the point in which the air separates from the surface of the ball, further backward, so that the layer stays attached further along the outer surface of the ball. It is the circumference portion of each dimple, where the dimple wall drops away from the outer surface of the ball, which actually creates the turbulence in the boundary layer.

Aerodynamic forces acting on a golf ball are typically resolved into orthogonal components of lift ($F_L$) and drag ($F_D$). Lift is defined as the aerodynamic force component acting perpendicular to the flight path. It results from a difference in pressure that is created by a distortion in the air flow that results from the back spin of the ball. Due to the back spin, the top of the ball moves with the air flow, which delays the separation to a point further aft. Conversely, the bottom of the ball moves against the air flow, moving the separation point forward. This asymmetrical separation creates an arch in the flow pattern, requiring the air over the top of the ball to move faster, and thus have lower pressure than the air underneath the ball.

Drag is defined as the aerodynamic force component acting parallel to the ball flight direction. As the ball travels through the air, the air surrounding the ball has different velocities and, thus, different pressures. The air exerts maximum pressure at the stagnation point on the front of the ball. The air then flows over the sides of the ball and has increased velocity and reduced pressure. The air separates from the surface of the ball, leaving a large turbulent flow area with low pressure, i.e., the wake. The difference between the high pressure in front of the ball and the low pressure behind the ball reduces the ball speed and acts as the primary source of drag.

Lift and drag, among other aerodynamic characteristics of a golf ball, are influenced by the external surface geometry of the ball, which includes the dimples thereon. As such, the dimples on a golf ball play an important role in controlling those parameters. For example, the dimples on a golf ball create a turbulent boundary layer around the ball, i.e., the air in a thin layer adjacent to the ball flows in a turbulent manner. The turbulence energizes the boundary layer and helps it stay attached further around the ball to reduce the area of the wake. This greatly increases the pressure behind the ball and substantially reduces the drag.

The design variables associated with the external surface geometry of a golf ball, e.g., surface coverage, dimple pattern layout, and individual dimple geometries, provide golf ball manufacturers the ability to control and optimize ball flight. Recently, golf ball manufacturers have begun to alter the surfaces of the dimple profiles in an attempt to optimize aerodynamic characteristics. However, adjustments and alterations to dimple profiles do not always result in enhanced aerodynamic performance.

Accordingly, there remains a need for a dimple profile having an altered surface that provides unique surface appearances, while maintaining desirable aerodynamic characteristics and ideal flight conditions.

SUMMARY OF THE INVENTION

The present invention is directed to a golf ball having a substantially spherical surface, including a plurality of circular dimples on the spherical surface, wherein at least a portion of the plurality of circular dimples include a concentric groove on each dimple surface, wherein each concentric groove has a groove diameter and each dimple has a dimple diameter, wherein a ratio of groove diameter to dimple diameter is about 0.05 to about 0.95, and wherein a ratio of $$\frac{S \cdot N}{4\pi R^2 P}$$

is about 0.01 or less, wherein S is the average surface area for all grooves on the ball, N is the number of grooved dimples on the ball, R is the radius of the ball, and P is the surface coverage of a dimple pattern used on the ball. In one embodiment, the groove diameter is about 0.0025 inches to about 0.285 inches. In another embodiment, the dimple diameter is about 0.050 inches to about 0.300 inches. In still another embodiment, each concentric groove has a width of about 0.00250 inches to about 0.0150 inches. In yet another embodiment, each concentric groove has a depth of about 0.0010 inches to about 0.0050 inches. Indeed, the concentric groove may have a half circular, triangular, or half square profile.

The present invention is also directed to a golf ball having a substantially spherical surface, including a plurality of dimples on the spherical surface, wherein at least 50 percent of the plurality of dimples include a circular perimeter, a dimple profile defined by a continuous function, and at least one concentric groove on a surface of the dimple profile, wherein the golf ball has a ratio of surface area of the grooves on the golf ball to the total surface area of the golf ball that is replaced by the plurality of dimples of about 0.010 or less, for example, of about 0.008 or less.

In one embodiment, the dimple profile is selected from the group consisting of spherical, conical, catenary, elliptical, polynomial, Witch of Agnesi, frequency, Neiles parabola, sine, cosine, hyperbolic sine, and hyperbolic cosine. For example, the dimple profile may be spherical, conical, or catenary. In another embodiment, the concentric groove has a profile that is substantially identical to the dimple profile. In still another embodiment, the concentric groove has a profile defined by the superposition of two or more continuous functions. In yet another embodiment, the concentric groove has a half circular, triangular, or half square profile. In this aspect, the portion of the plurality of circular dimples has a ratio of groove diameter to dimple diameter of about 0.20 to about 0.80.

The present invention is further directed to a golf ball dimple having a circular plan shape, including a circular plan shape; a spherical, conical, or catenary dimple profile; and at least one concentric groove on a surface of the dimple profile, wherein the concentric groove has a diameter of about 0.0025 inches to about 0.285 inches, a depth of about 0.0015 inches to about 0.0050 inches, and a width of about 0.0025 inches to about 0.0150 inches. In one embodiment, the concentric groove has a profile selected from the group consisting of half circular, half triangular, half square, half pentagonal, half hexagonal, half heptagonal, or half octagonal. For example, the profile of the concentric groove may be half circular, triangular, or half square. In another embodiment, the golf ball dimple further includes two concentric grooves on the surface of the dimple profile. In still another embodiment, the golf ball dimple further includes a ratio of groove diameter to dimple diameter of about 0.30 to about 0.70.

The present invention is also directed to a golf ball having a substantially spherical surface, including a plurality of dimples arranged in a dimple pattern on the spherical surface, wherein: the plurality of dimples includes dimples having a circular plan shape, at least a portion of the plurality of dimples include a non-concentric groove on each dimple surface, and the golf ball has a ratio of surface area of the grooves on the golf ball to total surface area of the golf ball that is replaced by the plurality of dimples of about 0.010 or less. In this aspect, each non-concentric groove has a groove diameter and each dimple has a dimple diameter, and wherein a ratio of groove diameter to dimple diameter is about 0.05 to about 0.95. In another embodiment, at least two dimples in the portion of dimples include non-concentric grooves with a planar preferential direction. In yet another embodiment, at least two dimples in the portion of dimples include non-concentric grooves with an axial preferential direction. In still another embodiment, each non-concentric groove has a groove diameter and a first centroid and each dimple has a dimple diameter and a second centroid, and wherein a distance between the first centroid and the second centroid is at least 5 percent of the dimple diameter.

The present invention is further directed to a golf ball having a substantially spherical surface, including a plurality of dimples arranged in a dimple pattern on the spherical surface, wherein: the plurality of dimples includes dimples having a circular plan shape, at least a portion of the plurality of dimples includes (i) at least two dimples having non-concentric grooves with a planar preferential direction, or (ii) at least two dimples having non-concentric grooves with an axial preferential direction, or (iii) a combination of (i) and (ii), and a ratio of $$\frac{S \cdot N}{4\pi R^2 P}$$

is about 0.01 or less, wherein S is the average surface area for all grooves on the ball, N is the number of grooved dimples on the ball, R is the radius of the ball, and P is the surface coverage of the dimple pattern. In this aspect, each non-concentric groove has a groove diameter and each dimple has a dimple diameter, and wherein a ratio of groove diameter to dimple diameter is about 0.05 to about 0.95. In another embodiment, the non-concentric grooves with an axial preferential direction are shifted relative to a symmetrical axis of the dimple pattern and the non-concentric grooves with a planar preferential direction are shifted relative to a symmetrical plane of the dimple pattern. In still another embodiment, the dimples having non-concentric grooves with an axial preferential direction are symmetrically arranged about a reference axis and the dimples having non-concentric grooves with a planar preferential direction are symmetrically arranged about a reference plane. In yet another embodiment, the portion of the plurality of dimples includes multiple groups of the at least two dimples having non-concentric grooves with an axial preferential direction. In this aspect, each group may be shifted relative to a different symmetrical axis of the dimple pattern. In another embodiment, each non-concentric groove has a groove diameter and a first centroid and each dimple has a dimple diameter and a second centroid, and wherein a distance between the first centroid and the second centroid is at least 5 percent of the dimple diameter.

Moreover, the present invention is directed to a golf ball having a substantially spherical surface, including a plurality of dimples arranged in a dimple pattern on the spherical surface, wherein: the plurality of dimples includes dimples having a circular plan shape, at least a portion of the plurality of dimples include one or more dimples having a concentric groove and two or more dimples having a non-concentric groove, and a ratio of $$\frac{S \cdot N}{4\pi R^2 P}$$

is about 0.01 or less, wherein S is the average surface area for all grooves on the ball, N is the number of grooved dimples on the ball, R is the radius of the ball, and P is the surface coverage of the dimple pattern. In this aspect, each concentric groove and each non-concentric groove has a groove diameter and each dimple has a dimple diameter, wherein a ratio of groove diameter to dimple diameter is about 0.05 to about 0.95. In still another embodiment, the one or more dimples having a concentric groove are centered along a reference axis or a reference plane. In yet another embodiment, the two or more dimples having a non-concentric groove are arranged adjacent to the centered dimples having a concentric groove. In another embodiment, the non-concentric grooves include an axial preferential direction or a planar preferential direction. In this aspect, each non-concentric groove has a groove diameter and a first centroid and each dimple has a dimple diameter and a second centroid, and wherein a distance between the first centroid and the second centroid is at least 10 percent of the dimple diameter.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

The present invention is directed to golf ball dimples having concentric or non-concentric grooves on the dimple surface. In particular, in one embodiment, the present invention is directed to a golf ball dimple having a circular plan shape, a profile defined by a continuous function, and a concentric groove on the surface of the dimple. In another embodiment, the present invention is directed to a golf ball dimple having a circular plan shape, a profile defined by a continuous function, and a non-concentric groove on the surface of the dimple. While the present invention described herein demonstrates the use of either a concentric groove or a non-concentric groove on a single dimple, the present invention may also contemplate a single dimple having both a concentric groove and a non-concentric groove. The present invention is also directed to the use of one or more of the dimples of the present invention in a dimple pattern applied to a golf ball.

Advantageously, in one embodiment, golf balls including dimples produced in accordance with the present invention have visually distinct surface textures. Indeed, the dimples of the present invention possess a unique visual appearance. Additionally, in another embodiment, the dimples of the present invention result in enhanced aerodynamic performance. In particular, the concentric groove lowers the air resistance immediately after the ball is hit because the boundary layer is thin, but has little to no effect on the thicker boundary layer once the ball is at the highest point of its trajectory and, thus, ultimately maintains lift. As a result, golf balls including the dimples of the present invention have visually distinct appearances that maintain ideal flight conditions.

Figure 1:
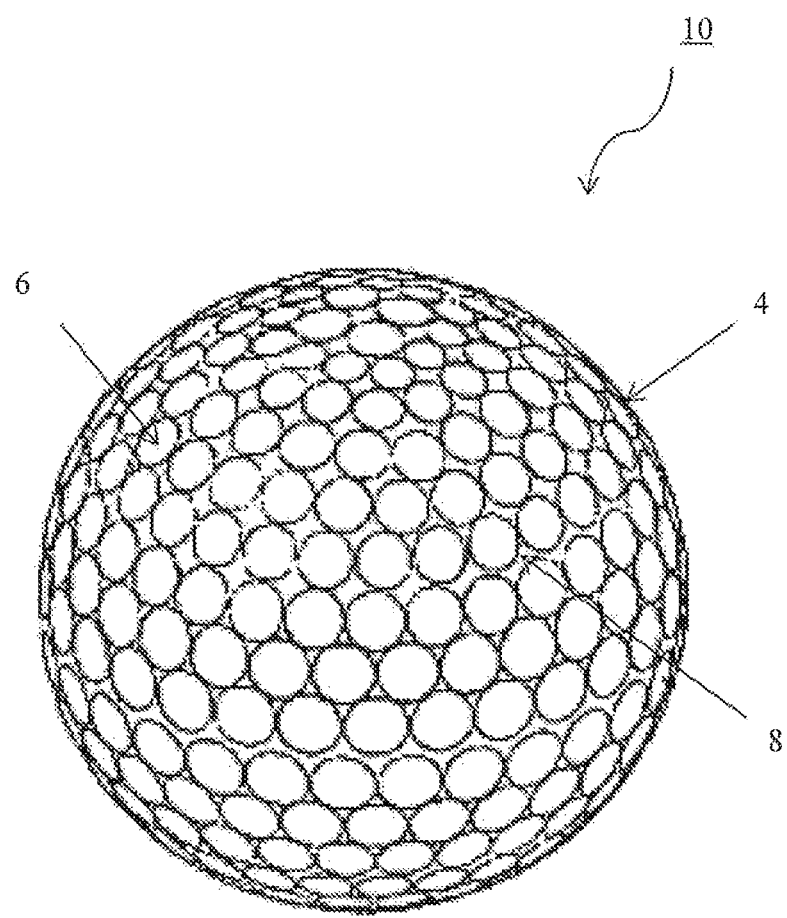
FIG. 1 illustrates a golf ball according to one embodiment of the present invention.

Referring to FIG. 1, a golf ball 10 has a spherical core (not shown) and a cover 4. Numerous dimples 6 are formed on the cover 4 of the golf ball. The upper flattened portion of the cover 4 extending from dimple to dimple is the land surface 8. Each dimple 6 has a plan shape. A dimple plan shape, as used herein, refers to the perimeter of the dimple as seen from a top view of the dimple, or the demarcation between the dimple and the outer surface of the golf ball or fret surface. The present invention contemplates dimples having a circular plan shape. However, non-circular plan shapes may also be suitable for use with the present invention.

According to the present invention, each circular dimple has a dimple profile. A dimple profile, as used herein, refers to the cross section of the dimple as seen from a side view of the dimple. The present invention contemplates dimples having profiles created from a continuous function. For example, the dimples of the present invention have circular plan shapes and corresponding dimple profiles that begin as a continuous function.

The profile of dimples according to the present invention may be defined by any known continuous function. For example, a continuous function is a function for which small changes in the input result in small changes in the output. In one embodiment, the present invention contemplates the use of continuous functions that lead to smooth transitions of the dimple profile to the golf ball surface.

In this aspect, the dimple profiles of the present invention may be defined by any continuous function including, but not limited to, a polynomial function, an exponential function, a trigonometric function, and a hyperbolic function. Specific non-limiting examples of suitable dimple profiles contemplated by the present invention include those that can be defined by the following functions: spherical, conical, catenary, elliptical, polynomial, Witch of Agnesi, frequency, Neiles parabola, sine, cosine, hyperbolic sine, and hyperbolic cosine profiles.

Figure 2A:
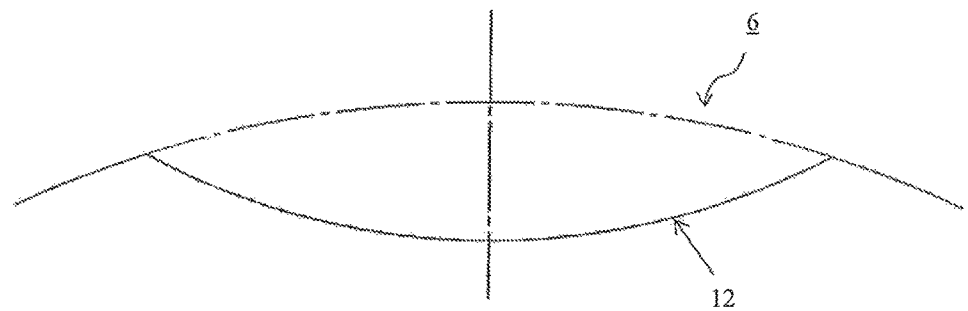
FIGS. 2A-2C illustrate various dimple profile shapes contemplated by the present invention.
Figure 2B:
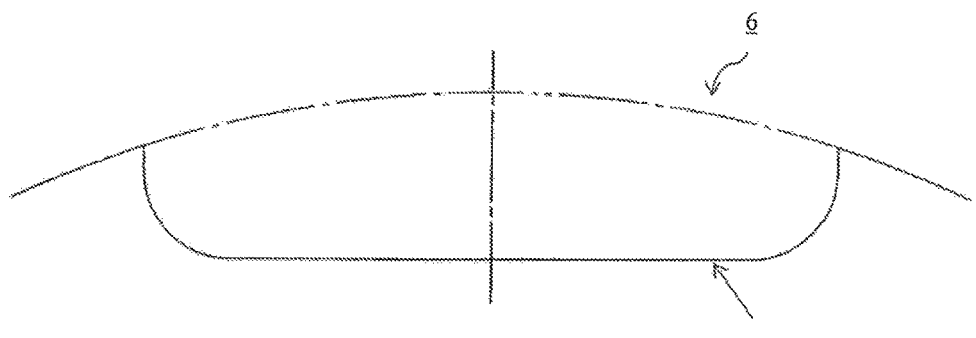
Figure 2C:
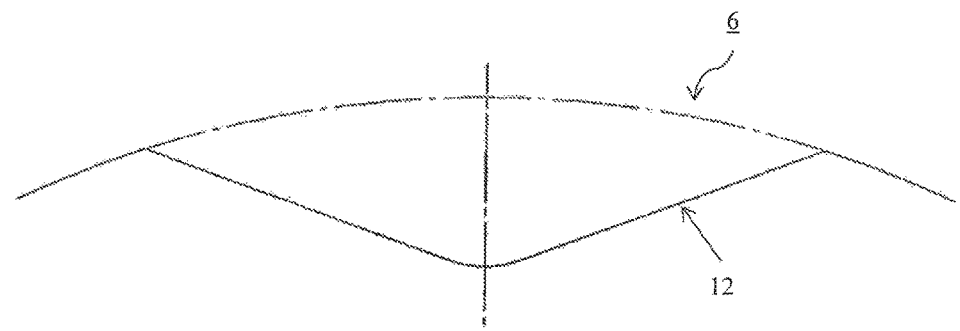

FIGS. 2A-2C illustrate various dimple profile shapes contemplated by the present invention. As shown in FIGS. 2A-2C, the dotted line represents the phantom spherical face of the dimple (i.e., the region of the surface of the golf ball that was cut away to form the dimple). In one embodiment, the dimple profile of the present invention is defined by a spherical profile. For example, FIG. 2A shows a cross-sectional view of a dimple 6 having a spherical profile 12. In another embodiment, the dimple profile of the present invention is defined by a catenary curve. As shown in FIG. 2B, a dimple 6 according to the present invention may have a catenary profile 12. In yet another embodiment, the dimple profile of the present invention is defined by a conical profile. Indeed, FIG. 2C shows a cross-sectional view of a dimple 6 having a conical profile 12.

According to one embodiment of the present invention, the circular golf ball dimples of the present invention include at least one groove on the dimple surface. In this aspect, the dimple includes a groove along the dimple profile surface such that no part of the groove is in contact with the land surface of the golf ball.

Concentric Grooves

Figure 3A:
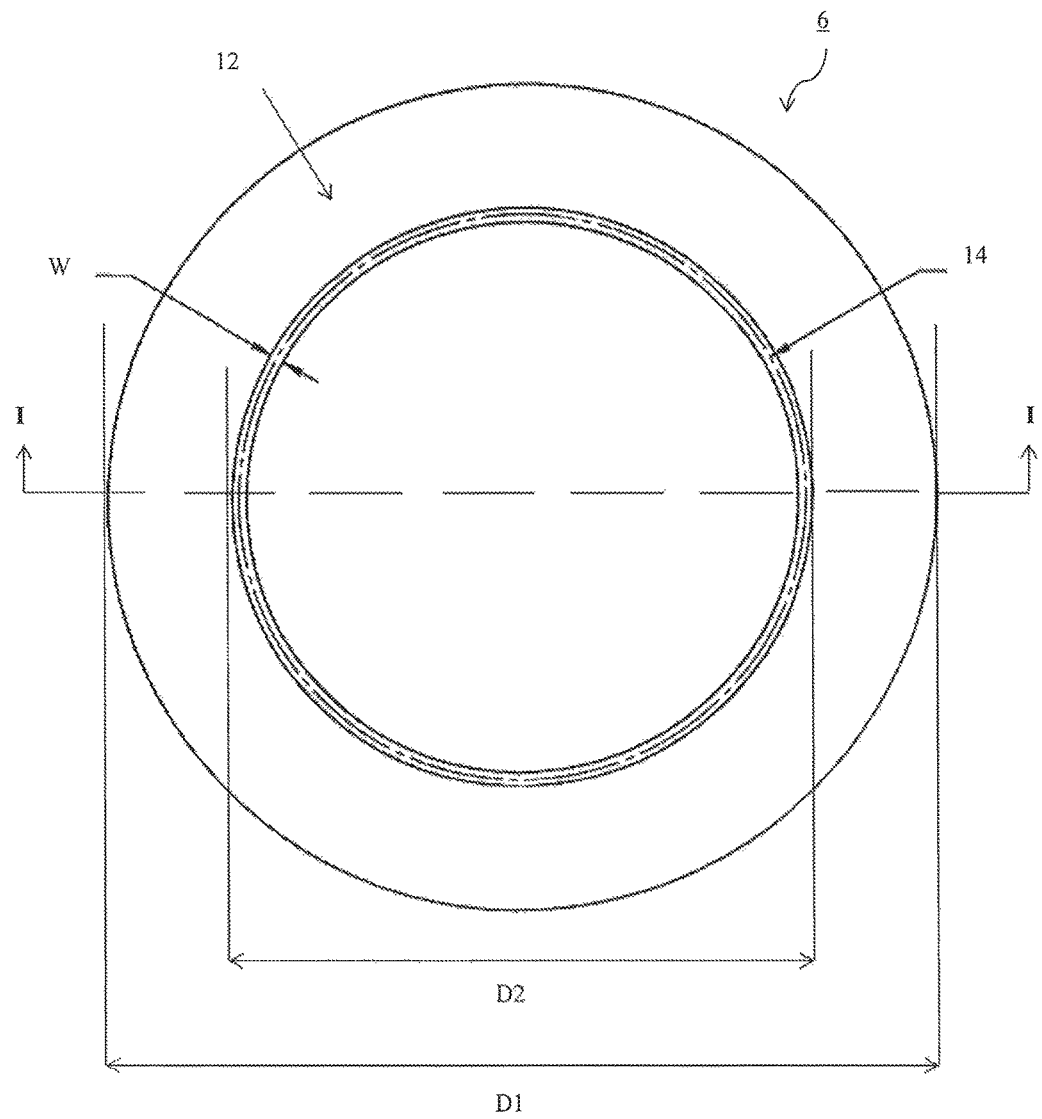
FIG. 3A illustrates an enlarged top plan view of a dimple according to an embodiment of the present invention.
Figure 3B:
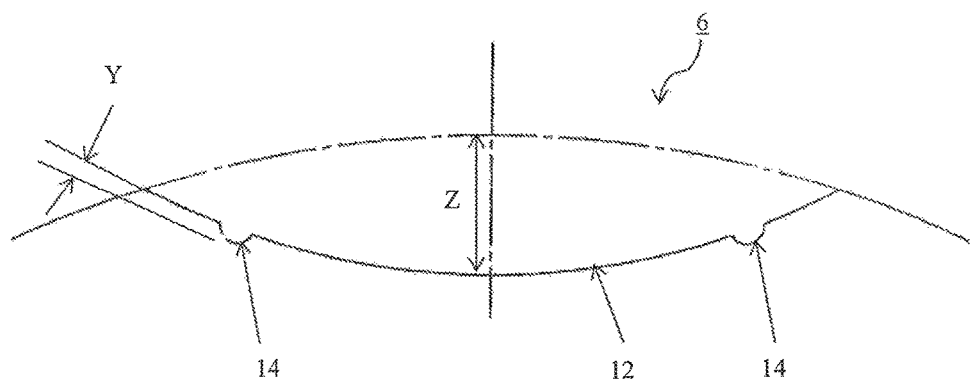
FIGS. 3B and 3C illustrate cross-sectional views (I-I) of the dimple depicted in FIG. 3A.

In one embodiment, the groove is concentric with the dimple perimeter so that the groove maintains a circular plan shape. In this aspect, the circular groove and the circular dimple share a common center or centroid. FIG. 3A illustrates an enlarged top plan view of a dimple according to one embodiment the present invention. As shown in FIG. 3A, the dimple 6 includes a dimple profile 12 and a concentric groove 14 on the surface of the dimple profile 12. The double dashed line located within the groove 14 represents the region of the surface that was cut away to form the groove 14. FIG. 3B is a cross-sectional view (I-I) of the dimple depicted in FIG. 3A. As shown in FIG. 3B, the dimple profile 12 begins as a continuous sloping profile and includes a groove 14 that forms a recess in the sloping profile. The dotted line shown in FIG. 3B represents the phantom spherical face of the dimple (i.e., the region of the surface of the golf ball that was cut away to form the dimple).

As shown in FIG. 3A, the dimple 6 has a diameter. For example, the dimple diameter D1 represents the distance between contact points when common tangent lines are depicted at both sides of the dimple 6. In one embodiment, the dimple diameter D1 is about 0.050 inches to about 0.300 inches. In another embodiment, the dimple diameter D1 is about 0.075 inches to about 0.275 inches. In yet another embodiment, the dimple diameter D1 is about 0.100 inches to about 0.250 inches. In still another embodiment, the dimple diameter D1 is about 0.125 inches to about 0.225 inches.

The dimple 6 also has a depth. As shown in FIG. 3B, the dimple depth is depicted by the double sided arrow Z. Indeed, the dimple depth Z represents the distance between the deepest part of the dimple 6 and the phantom spherical face of the dimple. In one embodiment, the dimple depth Z is within a range of about 0.003 inches to about 0.025 inches. In another embodiment, the dimple depth Z is about 0.005 inches to about 0.020 inches. In still another embodiment, the dimple depth Z is about 0.006 inches to about 0.017 inches.

Figure 3C:
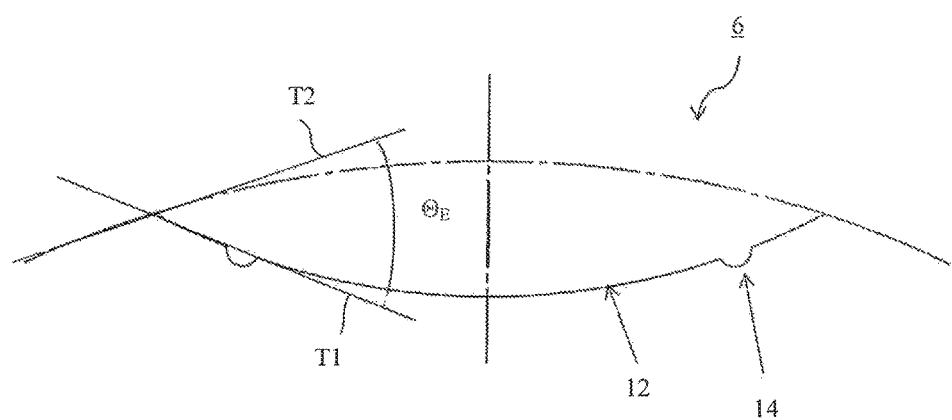

When the dimple profile is spherical, the dimple 6 also has an edge angle. Edge angle is often used in place of depth when describing spherical dimple profiles. The edge angle ($\Theta_E$) is defined as the angle between a first tangent line at the conical edge of the dimple profile and a second tangent line at the phantom ball surface. For example, as shown in FIG. 3C, the edge angle $\Theta_E$ is defined as the angle between the first tangent line T1 and the second tangent line T2. In one embodiment, the edge angle is about 10 degrees to about 15 degrees. In another embodiment, the edge angle may be about 13 degrees to about 15 degrees. For example, the edge angle may be about 14 degrees.

The concentric groove 14 has a diameter. As shown in FIG. 3A, the groove diameter D2 represents the distance between contact points when common tangent lines are depicted at both sides of the concentric groove 14. In one embodiment, the groove diameter D2 is about 0.0025 inches to about 0.285 inches. In another embodiment, the groove diameter D2 is about 0.0075 inches to about 0.250 inches. In yet another embodiment, the groove diameter D2 is about 0.010 inches to about 0.200 inches. In still another embodiment, the groove diameter D2 is about 0.050 inches to about 0.175 inches. Indeed, the groove diameter D2 may be about 0.100 inches to about 0.150 inches.

The location of the groove 14 on the dimple surface 12 may vary. In this aspect, the ratio of the groove diameter D2 to the dimple diameter D1 determines the location of the groove 14 along the dimple profile 12. For example, as will be apparent to one of ordinary skill in the art, a ratio approaching 1.00 will result in a groove located closer to the outer edge of the dimple, while a ratio approaching zero will result in a groove located closer to the center of the dimple.

The concentric groove diameter D2 maintains a given ratio to the corresponding dimple diameter D1. In one embodiment, the ratio of the groove diameter D2 to the dimple diameter D1 is about 0.05 to about 0.95. In another embodiment, the ratio of the groove diameter D2 to the dimple diameter D1 is about 0.10 to about 0.90. In still another embodiment, the ratio of the groove diameter D2 to the dimple diameter D1 is about 0.20 to about 0.80. In yet another embodiment, the ratio of the groove diameter D2 to the dimple diameter D1 is about 0.30 to about 0.70. In still another embodiment, the ratio of the groove diameter D2 to the dimple diameter D1 is about 0.40 to about 0.60.

The groove 14 also has a width. As shown in FIG. 3A, the width W of the groove 14 represents the distance between the outer and the inner edges of the groove 14. In one embodiment, the width W of the groove 14 is about 0.0150 inches or less. In another embodiment, the width W of the groove 14 is about 0.0100 inches or less. In still another embodiment, the width W of the groove 14 is about 0.0075 inches or less. In still another embodiment, the width W of the groove 14 is about 0.0050 inches or less. In yet another embodiment, the width W of the groove 14 is about 0.0025 inches or less.

The width W of the groove 14 may also be expressed as a ratio with the dimple diameter D1. In one embodiment, the width W of the groove is selected such that the ratio between the width W and the dimple diameter D1 is less than or equal to 0.05. In another embodiment, the ratio of the width W to the dimple diameter D1 is less than or equal to 0.04. In still another embodiment, the ratio of the width W to the dimple diameter D1 is less than or equal to 0.03. In yet another embodiment, the ratio of the width W to the dimple diameter D1 is less than or equal to 0.02.

In addition, the width W of the groove 14 may also be expressed as a ratio with the groove diameter D2. In one embodiment, the width W of the groove is selected such that the ratio between the width W and the groove diameter D2 ranges from about 0.018 to about 0.100. In another embodiment, the ratio of the width W to the groove diameter D2 ranges from about 0.018 to about 0.070. In still another embodiment, the ratio of the width W to the groove diameter D2 ranges from about 0.018 to about 0.053.

Further, the groove 14 has a depth. As shown in the cross-sectional view of FIG. 3B, the depth Y represents the distance from the phantom surface of the dimple profile 12 to the deepest portion of the groove 14. In one embodiment, the depth Y is about 0.0050 inches or less. In another embodiment, the depth Y is about 0.0025 inches or less. In still another embodiment, the depth Y is about 0.0015 inches or less. In yet another embodiment, the depth Y is about 0.0010 inches or less.

Figure 4A:
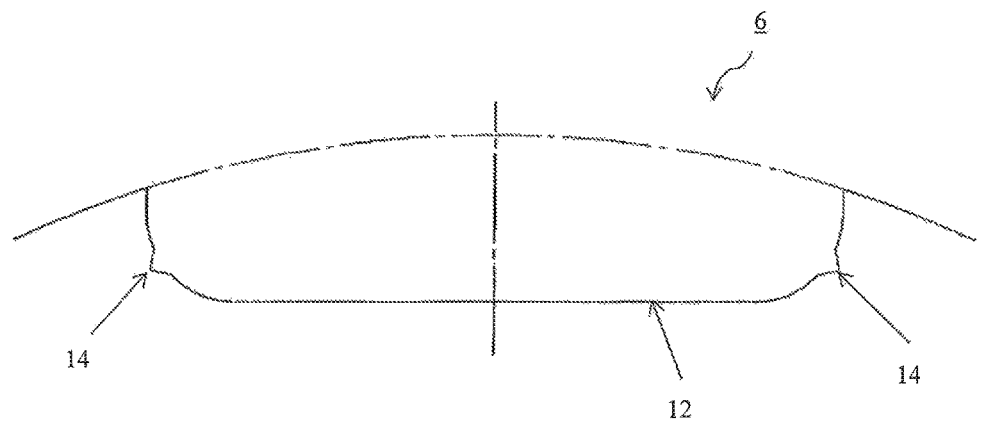
FIG. 4A-4B illustrate various groove profile shapes contemplated by the present invention.
Figure 4B:
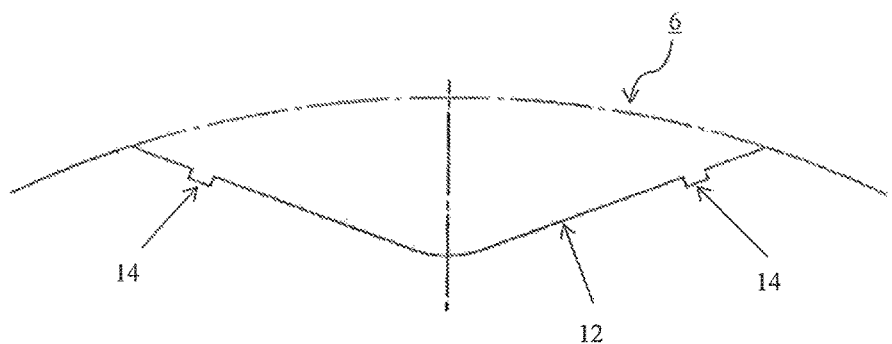

The cross-sectional shape of the groove 14 may also vary. As would be understood by one of ordinary skill in the art, the cross-sectional shape of the groove refers to the shape of the groove profile. In one embodiment, the cross-sectional shape of the groove 14 is half circular. For example, as shown in FIG. 3B, the cross-sectional shape of the groove 14 may be half round. In another embodiment, the cross-sectional shape of the groove 14 is half polygonal. Indeed, in this aspect of the invention, suitable polygons include, but are not limited to, triangles, squares, pentagons, hexagons, heptagons, and octagons. For instance, as shown in FIG. 4A, the cross-sectional shape of the groove 14 may be triangular such that the top phantom surface of the groove is the third leg of the triangle. Further, the cross-sectional shape of the groove 14 may be half of a square as shown in FIG. 4B. In yet another embodiment, the cross-sectional shape of the groove 14 may be half pentagonal, half hexagonal, half heptagonal, or half octagonal.

In another embodiment, the cross-sectional shape of the groove 14 is identical to the shape of the dimple profile 12. Indeed, any of the dimple profile shapes discussed above may be utilized as the profile of the groove. In still another embodiment, the cross-sectional shape of the groove 14 is defined by the superposition of two or more continuous and differentiable functions. For example, the cross-sectional shape of the groove 14 may be defined by combining a spherical curve and a different curve, such as a cosine curve, a frequency curve, or a catenary curve, as disclosed in U.S. Patent Publication Nos. 2015/0119171 and 2012/0165130, the entire disclosures of which are incorporated by reference herein.

In yet another embodiment, the profile of the groove 14 can be a weighted function. In this regard, the weighted function can be used to selectively control or modify the profile of the groove 14. For example, one or more continuous weighting functions can be applied as multiplicative constructs to the profile defined by any of the continuous functions discussed above to result in a continuous, differentiable weighted profile, as disclosed in U.S. Patent Publication No. 2013/0172123, which is incorporated in its entirety by reference herein.

Non-Concentric Grooves

Figure 9:
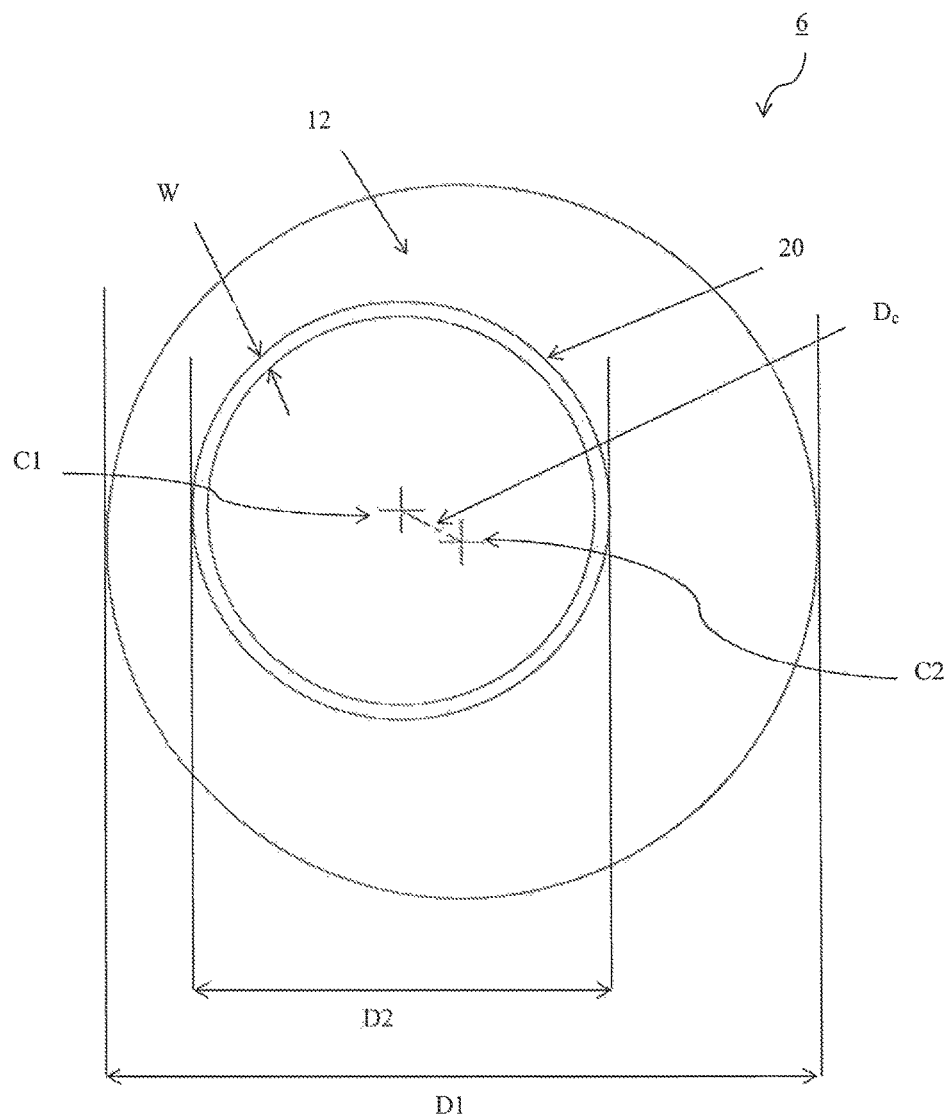
FIG. 9 illustrates an enlarged top plan view of a dimple according to another embodiment of the present invention.

In another embodiment, the groove is non-concentric with the dimple perimeter. In this aspect, the circular groove is positioned on the surface of a dimple with a circular plan shape such that the groove and the dimple perimeter are non-concentric. That is, the non-concentric groove and the circular dimple perimeter are off-center (i.e., the groove and the dimple do not share a common center or centroid). FIG. 9 illustrates an enlarged top plan view of a dimple according to one embodiment the present invention. As shown in FIG. 9, the dimple 6 includes a dimple profile 12 and a non-concentric groove 20 on the surface of the dimple profile 12. The space located within the non-concentric groove 20 represents the region of the surface that was cut away to form the groove 20. FIG. 9 also shows the centroid of each of the non-concentric groove 20 and the dimple 6. The center or centroid of the non-concentric groove 20 is represented by C1, while the center or centroid of the dimple 6 is represented by C2. As can be seen, the non-concentric groove 20 is off-center from dimple 6 and does not share a common centroid with dimple 6.

As discussed above with respect to concentric grooves, the dimple 6 has a diameter D1 (also shown in FIG. 9). Any of the values for dimple diameter D1 discussed above are suitable for use with dimples having non-concentric grooves 20. Similarly, any of the values for dimple depth Z discussed above are suitable for use with dimples having non-concentric grooves 20. Moreover, when the dimple having a non-concentric groove is spherical in nature, any of the values for the dimple edge angle $\Theta_E$ discussed above are suitable for use with spherical dimples having non-concentric grooves 20.

Like the dimple 6, the non-concentric groove 20 also has a diameter. As shown in FIG. 9, the non-concentric groove 20 has a diameter D2. The groove diameter D2 represents the distance between contact points when common tangent lines are depicted at both sides of the non-concentric groove 20. The groove diameter D2 determines the size of the groove in relation to the dimple. Any of the values for groove diameters D2 discussed above with respect to the concentric grooves are suitable for use with the non-concentric grooves 20. For instance, in one embodiment, the groove diameter D2 may be equal to about one half of the dimple diameter D1. In another embodiment, the groove diameter D2 may be equal to about one quarter of the dimple diameter D1. Similarly, any of the values for groove width W and groove depth Y discussed above are suitable for use with the non-concentric grooves 20.

In this aspect, because the aforementioned dimensions for dimple diameter D1, dimple depth Z, dimple edge angle $\Theta_E$, groove diameter D2, and groove width W are applicable to the non-concentric grooves as well as the dimples having the concentric grooves, any of the values for the ratio of the groove diameter D2 to the dimple diameter D1, the ratio of the groove width W to the dimple diameter D1, and the ratio of the groove width W to the groove diameter D2 discussed above are also applicable to the non-concentric grooves as well as the dimples having the concentric grooves.

The cross-sectional shape of the non-concentric groove 20 may also vary. The non-concentric groove 20 may have any cross-sectional shape discussed above with respect to the concentric grooves. For example, the non-concentric groove 20 may have any of the following cross-sectional shapes: half circular, half polygonal, triangular, half of a square, half pentagonal, half hexagonal, half heptagonal, or half octagonal. In another embodiment, the cross-sectional shape of the groove 20 may be identical to the shape of the dimple profile 12 utilized on the dimple 6. Indeed, any of the dimple profile shapes discussed above may be utilized as the profile of the non-concentric groove.

According to the present invention, the groove is considered to be non-concentric when the location of the centroid of the dimple plan shape is substantially different from the location of the centroid of the circular groove. More particularly, the groove is considered to be non-concentric when the distance between the centroid of the dimple plan shape and the centroid of the circular groove is greater than or equal to 5 percent of the dimple diameter D1 (i.e., 0.05×D1). In another embodiment, the groove may be considered non-concentric when the distance between the centroid of the dimple plan shape and the centroid of the circular groove is greater than or equal to 10 percent of dimple diameter D1 (i.e., 0.10×D1). In still another embodiment, the groove may be considered non-concentric when the distance between the centroid of the dimple plan shape and the centroid of the circular groove is greater than or equal to 20 percent of dimple diameter D1 (i.e., 0.20×D1). In yet another embodiment, the groove may be considered non-concentric when the distance between the centroid of the dimple plan shape and the centroid of the circular groove is greater than or equal to 25 percent of dimple diameter D1 (i.e., 0.25×D1). In another embodiment, the groove may be considered non-concentric when the distance between the centroid of the dimple plan shape and the centroid of the circular groove is greater than or equal to 30 percent of dimple diameter D1 (i.e., 0.30×D1). In still another embodiment, the groove may be considered non-concentric when the distance between the centroid of the dimple plan shape and the centroid of the circular groove is greater than or equal to 40 percent of dimple diameter D1 (i.e., 0.40×D1).

For example, as shown in FIG. 9, the centroid of the non-concentric groove 20 (C1) is located distance $D_c$ from the centroid of the dimple 6 (C2). In this non-limiting example, the non-concentric groove 20 has a groove diameter D2 of about one half of the dimple diameter D1 The distance between non-concentric groove centroid C1 and dimple centroid C2 (represented by $D_c$) is equal to about 10 percent of the dimple diameter D1. Thus, the groove depicted in FIG. 9 is considered to be non-concentric.

Unlike the concentric grooves which maintain the same centroid as the dimple, the location of the centroid of non-concentric groove 20 may vary across the dimple surface 12. That is, the non-concentric groove 20 may be located at any point on the surface of the dimple 6 so long as no part of the groove is in contact with the land surface of the golf ball. In another embodiment, the non-concentric grooves 20 of the present invention may be shifted within the dimple 6 in a preferred or preferential direction. As used herein, "preferential direction" refers to the shift of the non-concentric groove 20 on the dimple surface relative to a particular reference point. Examples of preferential direction may include planar preferential, meaning dimples are shifted toward or away from a given reference plane, and axial preferential, meaning dimples are shifted toward or away from a given reference axis.

In one embodiment, the non-concentric grooves 20 of the present invention may be shifted in an axial preferential direction. In this aspect, when the shift is axial preferential, the non-concentric grooves 20 are shifted relative to a reference axis. The reference axis may be any axis on the golf ball. That is, the non-concentric grooves 20 may be shifted relative to any axis of the dimple pattern on the golf ball. In one embodiment, the reference axis is an axis of symmetry, i.e., the non-concentric grooves 20 are shifted relative to an axis of symmetry of the dimple pattern. For example, the reference axis may be a polar axis. In another embodiment, the dimple pattern may include more than one reference axis. For instance, the dimple pattern may include multiple symmetrical axes such that multiple groups of non-concentric grooves are shifted relative to the different symmetrical axes. In this aspect, a single golf ball may include up to 20 different axes.

In this aspect, for a group of dimples to be defined as axial preferential, there must be at least two dimples having non-concentric grooves shifted relative to the same reference axis. In another embodiment, when there is an axial preferential shift, there may be at least three dimples having non-concentric grooves 20 shifted relative to the same reference axis, in another embodiment, when there is an axial preferential shift, there may be at least five dimples having non-concentric grooves 20 shifted relative to the same reference axis. In another embodiment, when there is an axial preferential shift, there may be at least six dimples having non-concentric grooves 20 shifted relative to the same reference axis. In still another embodiment, when there is an axial preferential shift, there may be at least eight dimples having non-concentric grooves 20 shifted relative to the same reference axis. In yet another embodiment, when there is an axial preferential shift, there may be at least ten dimples having non-concentric grooves 20 shifted relative to the same reference axis. For instance, when there is an axial preferential shift, there may be at least 12 dimples having non-concentric grooves 20 shifted relative to the same reference axis. In still other embodiments, every dimple on the golf ball may have non-concentric grooves 20 shifted relative to the same reference axis, for example, the polar axis.

When the preferential direction is axial preferential, the direction of the shift may vary. In one embodiment, the direction of the shift is toward the reference axis. That is, the non-concentric grooves 20 are shifted toward the edge of the dimple 6 that is closest to the reference axis. The distance of the shift will depend on the placement of the groove centroid. For example, as placement of the groove centroid approaches the edge of the dimple that is closest to the reference axis, the greater the shift toward the reference axis. In other words, if the groove centroid is closer to the reference axis than the centroid of the dimple plan shape, then the non-concentric groove 20 is shifted toward the reference axis. In another embodiment, the direction of the shift is away from the reference axis. For instance, the non-concentric grooves 20 are shifted away from the edge of the dimple 6 that is closest to the reference axis. Here, as placement of the groove centroid approaches the edge of the dimple that is farthest from the reference axis, the greater the shift away from the reference axis. In other words, if the groove centroid is farther away from the reference axis than the centroid of the dimple plan shape, then the non-concentric groove 20 is shifted away from the reference axis.

In this aspect, in a group of dimples defined as axial preferential, all of the non-concentric grooves 20 in the dimple group may be shifted in the same direction. For example, all of the non-concentric grooves 20 on the dimples may be shifted toward the reference axis. Alternatively, all of the non-concentric grooves 20 on the dimples may be shifted away from the reference axis. In another embodiment, in a group of dimples defined as axial preferential, some of the non-concentric grooves 20 in the dimple group may be shifted toward the reference axis, while other non-concentric grooves 20 in the dimple group may be shifted away from the reference axis (and vice versa). For instance, in a group of five dimples defined as axial preferential, three of the dimples may have non-concentric grooves 20 that are shifted toward the reference axis, while the other two dimples may have non-concentric grooves 20 shifted away from the reference axis.

Figure 10A:
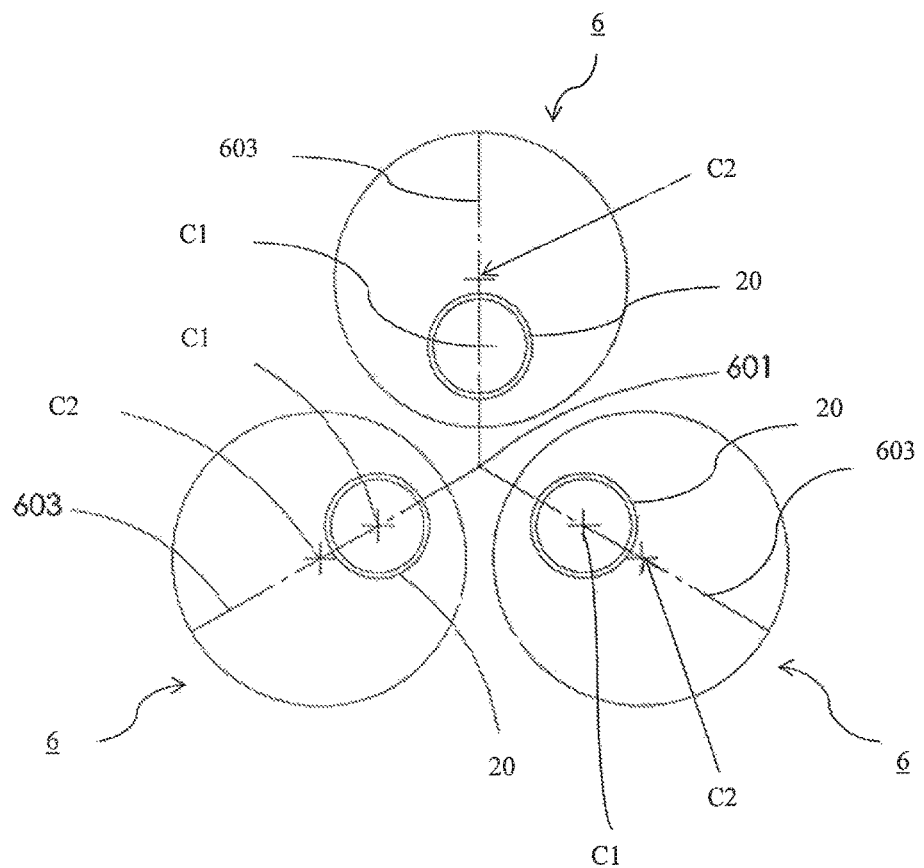
FIG. 10A-10B illustrate an arrangement of non-concentric grooved dimples according to one embodiment of the present invention.
Figure 10B:
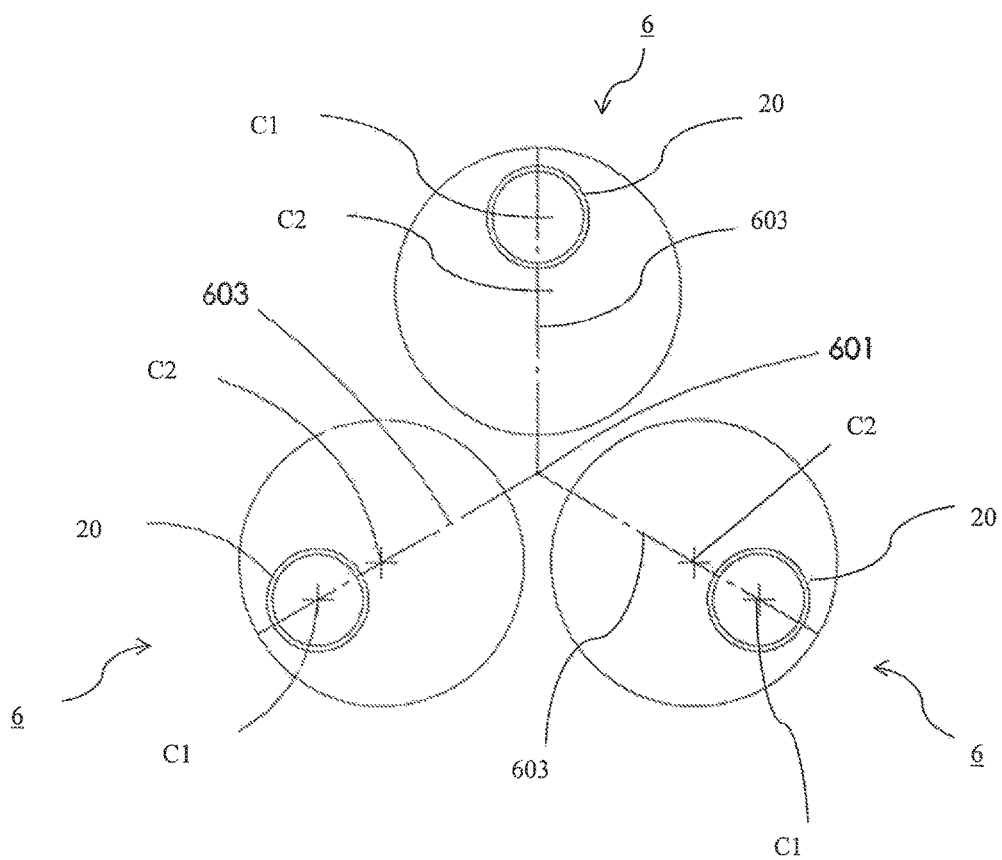

FIGS. 10A and 10B are non-limiting examples of groups of dimples having non-concentric grooves 20 that are defined as axial preferential. As shown in both FIGS. 10A and 10B, a group of three dimples have non-concentric grooves 20. The non-concentric grooves 20 are shifted relative to a reference axis (the axis is normal to the given view). An axial preferential shift, such as that shown in FIGS. 10A and 10B, may be done by identifying the dimple centroid and drawing a reference line that passes through the dimple centroid and the reference axis. As shown in FIGS. 10A and 10B, each of the dimple centroids is identified (represented by C2) and reference lines 603 are drawn for each of the dimples. Reference line 603 passes through each dimple centroid C2 and the reference axis 601. After the dimple centroids are determined, the non-concentric grooves and the groove centroids are identified. To achieve a shift that is defined as axial preferential, the centroids of the non-concentric grooves should lie on the reference lines. For example, as shown in FIGS. 10A and 10B, each of the centroids C1 of the non-concentric grooves 20 is located on reference lines 603. In other words, because the groove centroids C1 are located on a reference line that passes through the reference axis, the shift of the non-concentric grooves 20 on the dimples depicted in FIGS. 10A and 10B is axial preferential. However, as can be seen from FIG. 10A, the non-concentric grooves 20 are shifted toward the reference axis, while the non-concentric grooves 20 of FIG. 10B are shifted away from the reference axis.

The arrangement of the non-concentric grooves 20 on the dimples in each axial preferential group may vary. In one embodiment, the non-concentric grooves 20 may be symmetric about the reference axis. In another embodiment, the non-concentric grooves 20 may be arranged randomly about the reference axis.

In another embodiment, the non-concentric grooves 20 of the present invention may be shifted in a planar preferential direction. In this aspect, when the shift is planar preferential, the non-concentric grooves 20 are shifted relative to a reference plane on a dimple pattern. The reference plane may be any plane on the golf ball. That is, the non-concentric grooves 20 may be shifted relative to any plane on the golf ball. In one embodiment, the reference plane is a plane of symmetry, i.e., the non-concentric grooves 20 are shifted relative to a plane of symmetry. For example, the reference plane may be a center plane. In another embodiment, the dimple pattern may include more than one reference plane. For instance, the dimple pattern may include multiple planes of symmetry such that multiple groups of non-concentric grooves are shifted relative to the different symmetrical planes.

In this aspect, for a group of dimples to be defined as planar preferential, there must be at least two dimples having non-concentric grooves 20 that share the same reference plane, in another embodiment, when there is a planar preferential shift, there may be at least three dimples having non-concentric grooves 20 shifted relative to the same reference plane. In still another embodiment, when there is a planar preferential shift, there may be at least six dimples having non-concentric grooves 20 shifted relative to the same reference plane. In yet another embodiment, when there is a planar preferential shift, there may be at least 12 dimples having non-concentric grooves 20 shifted relative to the same reference plane. For instance, when there is a planar preferential shift, there may be at least 20 dimples having non-concentric grooves 20 shifted relative to the same reference plane. In still other embodiments, every dimple on the golf ball may have non-concentric grooves 20 shifted relative to the same reference plane, for example, the center plane.

When the preferential shift is planar preferential, the direction of the shift may vary. In one embodiment, the direction of the shift is toward the reference plane. That is, the non-concentric grooves 20 are shifted toward the edge of the dimple 6 that is closest to the reference plane. The distance of the shift will depend on the placement of the groove centroid. For example, as placement of the groove centroid approaches the edge of the dimple that is closest to the reference plane, the greater the shift toward the reference plane. In other words, if the groove centroid is closer to the reference plane than the centroid of the dimple plan shape, then the non-concentric groove 20 is shifted toward the reference plane. In another embodiment, the direction of the shift is away from the reference plane. For instance, the non-concentric grooves 20 are shifted away from the edge of the dimple 6 that is closest to the reference plane. Here, as placement of the groove centroid approaches the edge of the dimple that is farthest from the reference plane, the greater the shift away from the reference plane. In other words, if the groove centroid is farther away from the reference plane than the centroid of the dimple plan shape, then the non-concentric groove 20 is shifted away from the reference plane.

In this aspect, in a group of dimples defined as planar preferential, all of the non-concentric grooves 20 in the dimple group may be shifted in the same direction. For example, all of the non-concentric grooves 20 on the dimples may be shifted toward the reference plane. Alternatively, all of the non-concentric grooves 20 on the dimples may be shifted away from the reference plane. In another embodiment, in a group of dimples defined as planar preferential, some of the non-concentric grooves 20 in the dimple group may be shifted toward the reference plane, while other non-concentric grooves 20 in the dimple group may be shifted away from the reference plane (and vice versa). For instance, in a group of twelve dimples defined as planar preferential, seven of the dimples may have non-concentric grooves 20 that are shifted toward the reference plane, while the other five dimples may have non-concentric grooves 20 shifted away from the reference plane. In still another embodiment, the shift may be parallel to the reference plane.

Figure 11A:
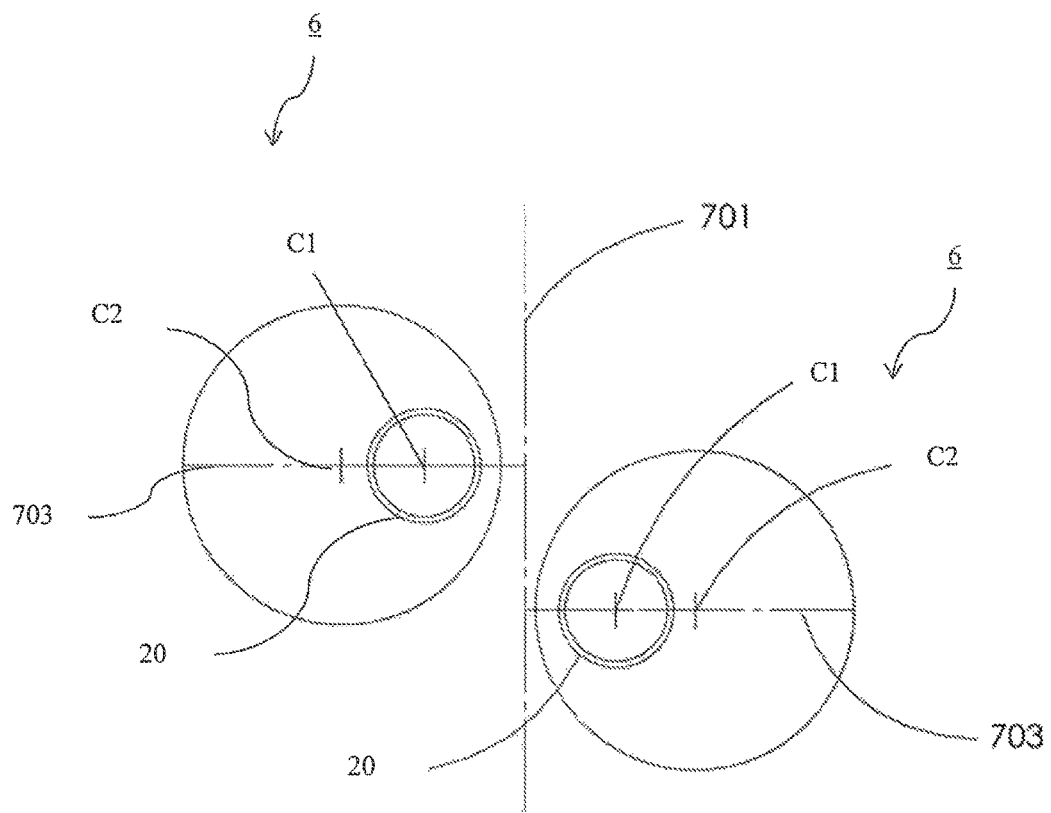
FIGS. 11A-11B illustrate an arrangement of non-concentric grooved dimples according to another embodiment of the present invention.
Figure 11B:
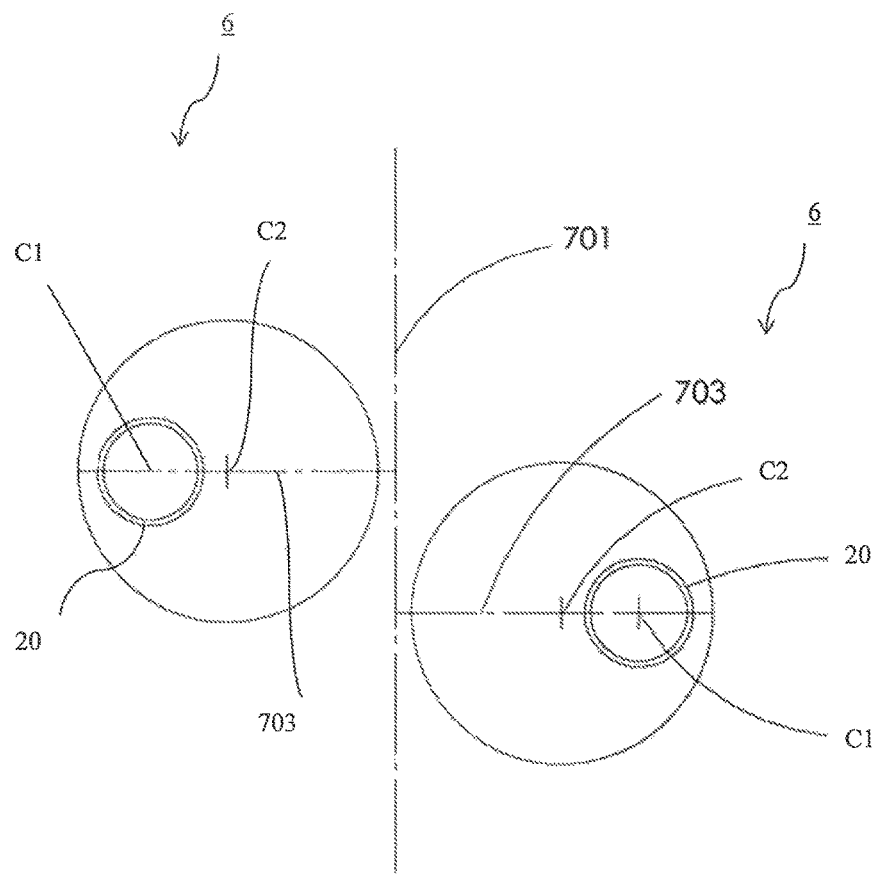

FIGS. 11A and 11B are non-limiting examples of groups of dimples having non-concentric grooves 20 that are defined as planar preferential. As shown in both FIGS. 11A and 11B, a group of two dimples have non-concentric grooves 20. The dimples having non-concentric grooves 20 share the same reference plane 701. A planar preferential shift, such as that shown in FIGS. 11A and 11B, may be done by identifying the dimple centroid and drawing a reference line that passes through the dimple centroid and that is normal to the reference plane. As shown in FIGS. 11A and 11B, each of the dimple centroids is identified (represented by C2) and reference lines 703 are drawn for each of the dimples. Reference line 703 passes through each dimple centroid C2 and is normal to reference plane 701. After the dimple centroids are determined, the non-concentric groove and the groove centroid are identified. To achieve a shift that is defined as planar preferential, the centroid of the non-concentric groove should lie on the reference line. For example, as shown in FIGS. 11A and 11B, each of the centroids C1 of the non-concentric grooves 20 is located on the reference lines 703. In other words, because the groove centroids C1 are located on a reference line that is normal to the reference plane, the shift of the non-concentric grooves 20 on the dimples depicted in FIGS. 11A and 11B is planar preferential. However, as can be seen from FIG. 11A, the non-concentric grooves 20 are shifted toward the reference plane, while the non-concentric grooves 20 of FIG. 11B are shifted away from the reference plane.

The arrangement of the non-concentric grooves 20 on the dimples in each planar preferential group may vary. In one embodiment, the non-concentric grooves 20 may be symmetric about the reference plane. In another embodiment, the non-concentric grooves 20 may be arranged randomly about the reference plane.

In another embodiment of the present invention, dimples having non-concentric grooves 20 shifted in an axial preferential direction may be used in combination with dimples having non-concentric grooves 20 shifted in a planar preferential direction. In this aspect, any of the axial preferential and planar preferential non-concentric grooves may be shifted toward the respective reference axis or plane or away from the respective reference axis or plane.

In still another embodiment, dimple groups contemplated by the present invention may include dimples having concentric grooves 14 and dimples having non-concentric grooves 20. In one embodiment, dimples having concentric grooves 14 may be used in combination with dimples having non-concentric grooves 20 shifted in an axial preferential direction, hi this aspect, the dimples having concentric grooves 14 may be centered at the reference axis, while the dimples having non-concentric grooves 20 may be arranged around the concentric grooved dimples in an axial preferential direction. In another embodiment, dimples having concentric grooves 14 may be used in combination with dimples having non-concentric grooves 20 shifted in a planar preferential direction. In this aspect, the dimples having concentric grooves 14 may be centered at the reference plane, while the dimples having non-concentric grooves 20 may be arranged around the concentric grooved dimples in a planar preferential direction. In still another embodiment, dimples having concentric grooves 14 may be used in combination with dimples having non-concentric grooves 20 shifted in an axial preferential direction and dimples having non-concentric grooves 20 shifted in a planar preferential direction. In any of the above-described embodiments, when the axial preferential and planar preferential non-concentric grooves 20 are used in combination with concentric grooves 14, the axial preferential and planar preferential non-concentric grooves 20 may be shifted toward the respective reference axis/plane, away from the respective reference axis/plane, or combinations thereof. Furthermore, any of the above-described arrangements may include dimples having no grooves.

Surface Area

Regardless of whether the groove is concentric or non-concentric, the surface area of the groove may vary based on the width W, depth Y, and shape of the groove. However, in one embodiment, the surface area of the concentric and non-concentric grooves contemplated by the present invention is about 0.00010 square inches to about 0.010 square inches. In another embodiment, the surface area of the concentric and non-concentric grooves is about 0.00020 square inches to about 0.0050 square inches. In still another embodiment, the surface area of the concentric and non-concentric grooves is about 0.00025 square inches to about 0.0010 square inches.

In this aspect of the invention, the surface area of the dimple 6 is increased by the addition of the concentric groove 14 or the non-concentric groove 20. In one embodiment, the surface area of the dimple 6 having the concentric groove 14 or the non-concentric groove 20 is increased by about 1.0 percent when compared to the surface area of a dimple without a groove. In another embodiment, the surface area of the dimple 6 having the concentric groove 14 or the non-concentric groove 20 is increased by about 2.0 percent when compared to the surface area of a dimple without a groove. In still another embodiment, the surface area of the dimple 6 having the concentric groove 14 or the non-concentric groove 20 is increased by about 3.0 percent when compared to the surface area of a dimple without a groove.

In another embodiment, the relationship between the surface area of the grooves on the ball and the surface area of the parts of the ball that are replaced by dimples can be expressed as the following ratio:

$$\frac{S \cdot N}{4\pi R^2 P}$$

where:
S is the average surface area for all grooves on the ball;
N is the number of grooved dimples on the ball;
R is the radius of the ball; and
P is the surface coverage of the dimple pattern used on the ball.

In this aspect of the present invention, the number of dimples on the ball may range from about 200 dimples to about 500 dimples. In another embodiment, the number of dimples may range from about 250 dimples to about 450 dimples. In still another embodiment, the number of dimples may range from about 300 dimples to 400 dimples. In yet another embodiment, the number of dimples may range from 300 to 350 dimples.

While the concentric and non-concentric grooved dimples of the present invention may be used for one or more dimples on a golf ball, it is not necessary that the grooved dimples be used on every dimple of a golf ball. In general, it is preferred that a sufficient number of dimples on the ball are constructed in accordance with the present invention so that the aerodynamic characteristics of the ball may be altered. In this aspect of the present invention, the number of grooved dimples on the ball N may range from at least about 15 percent of the dimples to about 100 percent of the dimples. For example, at least about 25 percent of the dimples on the golf ball include at least one concentric groove or at least one non-concentric groove according to the present invention. In another embodiment, at least about 50 percent of the dimples on the golf ball include at least one concentric groove or at least one non-concentric groove according to the present invention. In still another embodiment, at least about 70 percent of the dimples on the golf ball include at least one concentric groove or at least one non-concentric groove according to the present invention. In yet another embodiment, at least about 90 percent of the dimples on the golf ball include at least one concentric groove or at least one non-concentric groove. Indeed, 100 percent of the dimples on the golf ball may include the concentric grooved or non-concentric grooved dimples of the present invention.

In one embodiment, the total surface area for all grooves (including both concentric grooves and non-concentric grooves) on the ball (represented by S·N) may range from about 0.010 square inches to about 0.080 square inches. In another embodiment, the total surface area for all grooves on the ball may range from about 0.020 square inches to about 0.070 square inches. In still another embodiment, the total surface area for all grooves on the ball may range from about 0.030 square inches to about 0.060 square inches. For example, the average surface area for all grooves on the ball may be about 0.050 square inches.

In this aspect, the diameter of the golf ball may range from about 1.680 inches to about 1.800 inches, more preferably from about 1.680 inches to about 1.760 inches. A diameter of from about 1.680 inches (43 mm) to about 1.740 inches (44 mm) is most preferred. Thus, in one embodiment, the radius of the ball R may range from about 0.840 inches to about 0.880 inches. In another embodiment, the radius of the ball R may range from about 0.840 inches to about 0.870 inches.

Further, in this aspect of the invention, the surface coverage of all dimples on the ball P may range from about 65 percent to about 90 percent. In another embodiment, the surface coverage of all dimples P may range from about 70 percent to 88 percent. In still another embodiment, the surface coverage of all dimples P may range from about 72 percent to 85 percent. In yet another embodiment, the surface coverage of all dimples P may range from about 75 percent to 83 percent.

The surface coverage of a dimple pattern P is related to the total surface area of the golf ball that is replaced by dimples. In this aspect, the total surface area of the ball that is replaced by a dimple pattern may range from about 5.70 square inches to about 8.00 square inches. In another embodiment, the total surface area of the ball that is replaced by a dimple pattern may range from about 6.20 square inches to about 7.80 square inches. In still another embodiment, the total surface area of the ball that is replaced by a dimple pattern may range from about 6.40 square inches to about 7.50 square inches. For example the total surface area of the ball that is replaced by a dimple pattern may be about 7.35 square inches.

Overall, according to the present invention, the ratio of the surface area of all grooves on the ball to the total surface area of the ball that is replaced by dimples (as described above) is about 0.010 or less. In another embodiment, the ratio of the surface area of the grooves on the ball to the total surface area of the ball that is replaced by dimples is about 0.008 or less. In still another embodiment, the ratio of the surface area of the grooves on the ball to the total surface area of the ball that is replaced by dimples is about 0.006 or less. In yet another embodiment, the ratio of the surface area of the grooves on the ball to the total surface area of the ball that is replaced by dimples is about 0.005 or less.

Figure 5:
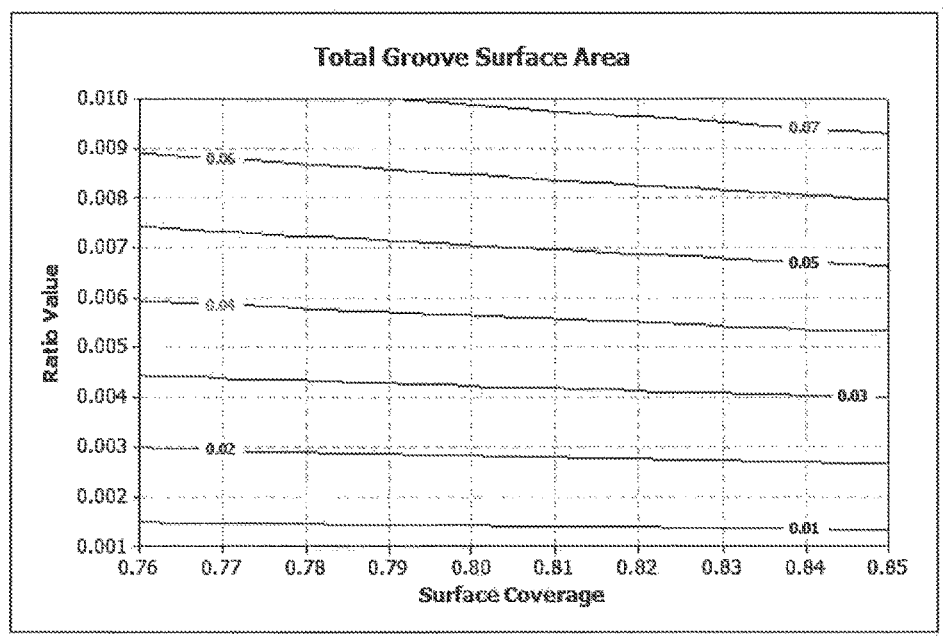
FIG. 5 is a graphical representation of groove surface areas.

FIG. 5 shows the relationship between the ratio of the surface area of the grooves on the ball to the surface area of a spherical ball that is replaced by dimples. For example, at a total groove surface area of 0.06 square inches, the ratio value (e.g., the ratio of the surface area of the grooves on the ball to the total surface area of the ball that is replaced by a dimple pattern) decreases from about 0.009 to about 0.008 as the surface coverage increases over a range of 0.76 to 0.85. Similarly, at a total groove surface area of 0.03 square inches, the ratio value (e.g., the ratio of the surface area of the grooves on the ball to the total surface area of the ball that is replaced by a dimple pattern) decreases from about 0.0045 to about 0.004 as the surface coverage increases over a range of 0.76 to 0.85.

While the dimples of the present invention have been described herein as having one groove, it should be understood that the dimples of the present invention may include one or more concentric or non-concentric grooves. In one embodiment, the dimples of the present invention include at least two concentric grooves 14 or at least two non-concentric grooves 20. In another embodiment, the dimples of the present invention include at least three concentric grooves 14 or at least three non-concentric grooves 20. In this aspect, the concentric grooves 14 and non-concentric grooves 20 may be located at any point along the dimple profile surface so long as the dimensions of the grooves are within the parameters discussed above.

Dimple Patterns & Packing

Figure 6:
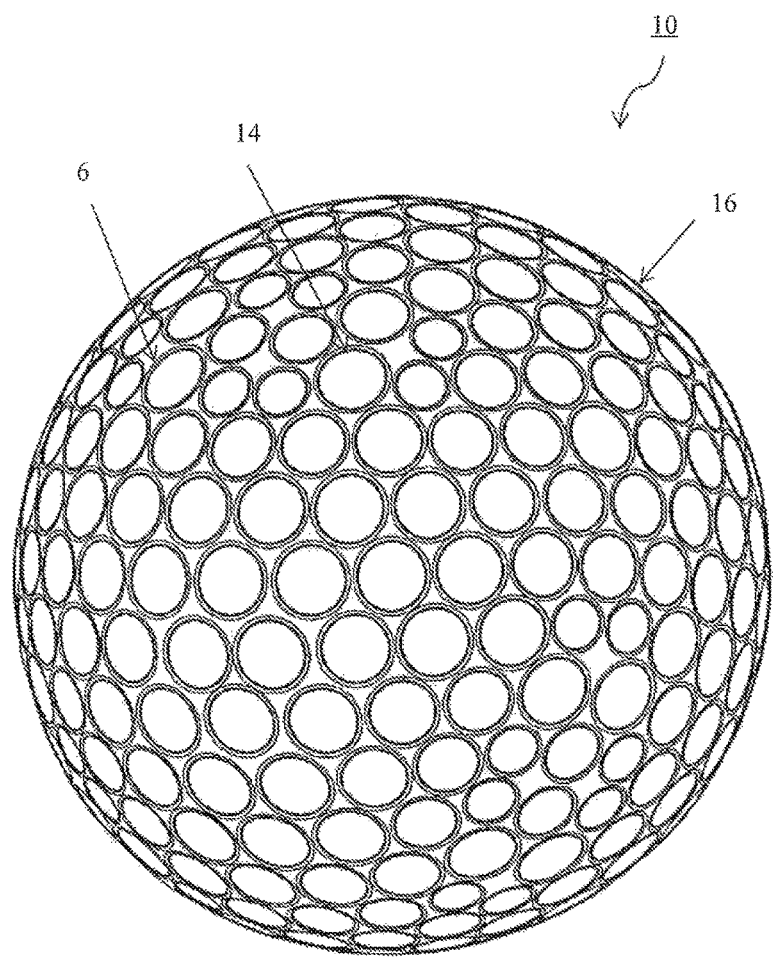
FIG. 6 illustrates a dimple pattern of a golf ball created in accordance with one embodiment of the present invention.
Figure 7:
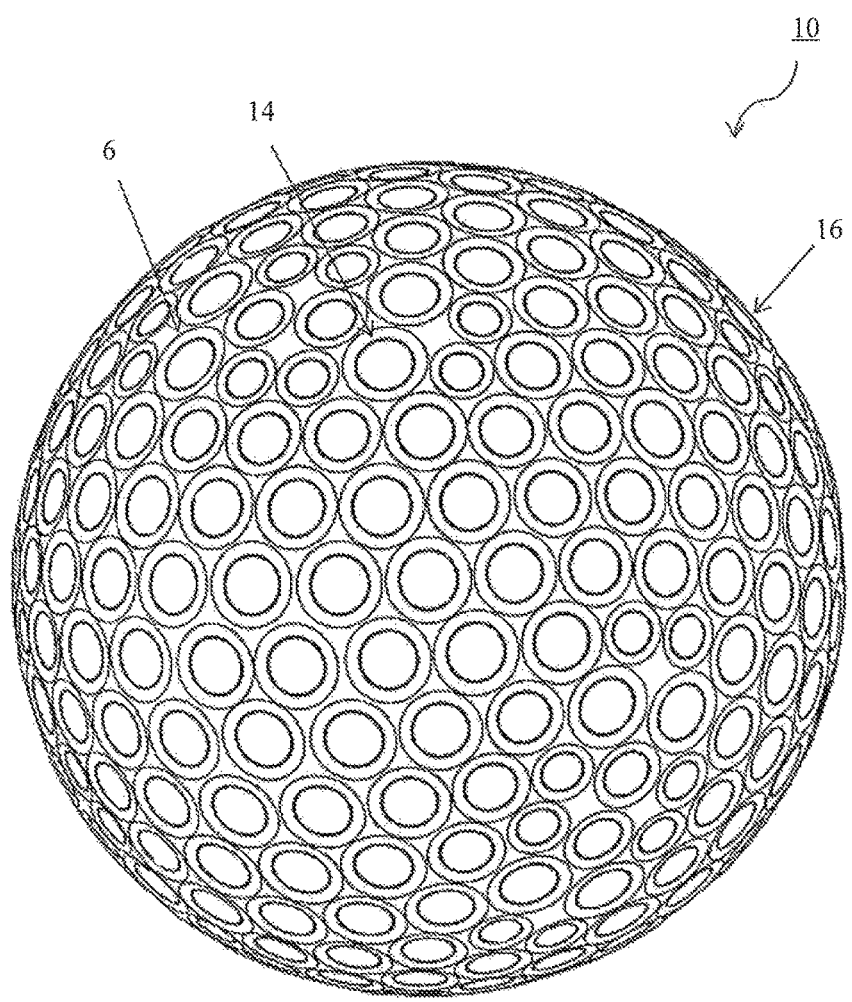
FIG. 7 illustrates a dimple pattern of a golf ball created in accordance with another embodiment of the present invention.
Figure 8:
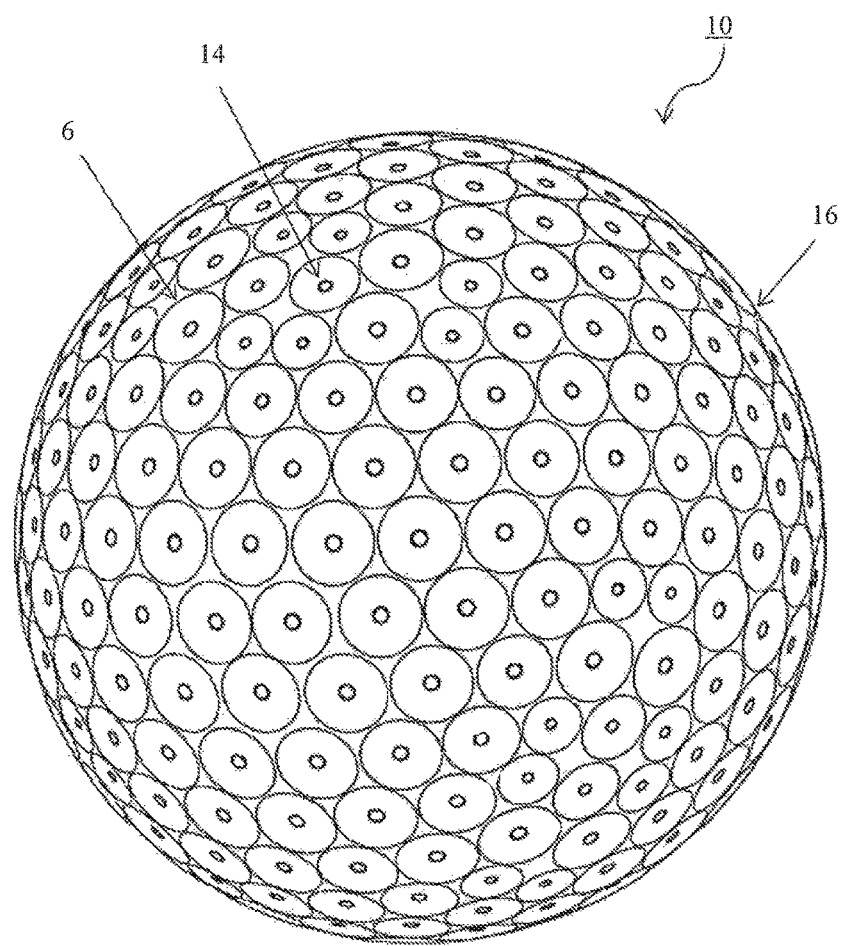
FIG. 8 illustrates a dimple pattern of a golf ball created in accordance with still another embodiment of the present invention.

The grooved dimples produced in accordance with the present invention can be used in constructing a visually distinct dimple pattern that improves the aerodynamic performance of the golf ball. FIGS. 6-8 demonstrate various dimple patterns created in accordance with the present invention. For example, FIG. 5 shows a dimple pattern 16 having concentric grooved dimples produced in accordance with the present invention. As shown in FIG. 6, all of the dimples 6 on the golf ball 10 include a concentric groove 14 having a ratio of the groove diameter D2 to the dimple diameter D1 of 0.90. In this aspect, due to the higher ratio of D2:D1, the concentric groove is located closer to the outer edge of the dimple. FIG. 7 shows a dimple pattern 16 having concentric grooved dimples produced in accordance with another embodiment of the present invention. As shown in FIG. 7, all of the dimples 6 on the golf ball 10 include a concentric groove 14 having a ratio of the groove diameter D2 to the dimple diameter D1 of 0.70. In still another embodiment, FIG. 8 shows a dimple pattern 16 having concentric grooved dimples produced in accordance with the present invention. As shown in FIG. 8, all of the dimples 6 on the golf ball 10 include a concentric groove 14 having a ratio of the groove diameter D2 to the dimple diameter D1 of 0.20. In this aspect, due to the lower ratio of D2:D1, the concentric groove is located closer to the center of the dimple.

In one embodiment, a dimple pattern may include a random arrangement of concentric and/or non-concentric grooved dimples. In another embodiment, a dimple pattern may include various groups of non-concentric and/or concentric grooved dimples arranged around the golf ball. In this aspect, the non-concentric grooved dimples utilized in dimple patterns contemplated by the present invention may be shifted in a preferential direction or may not be shifted in a preferential direction. In another embodiment, the dimple patterns may include a combination of non-concentric grooved dimples that are shifted in a preferential direction and are not shifted in a preferential direction.

Figure 12:
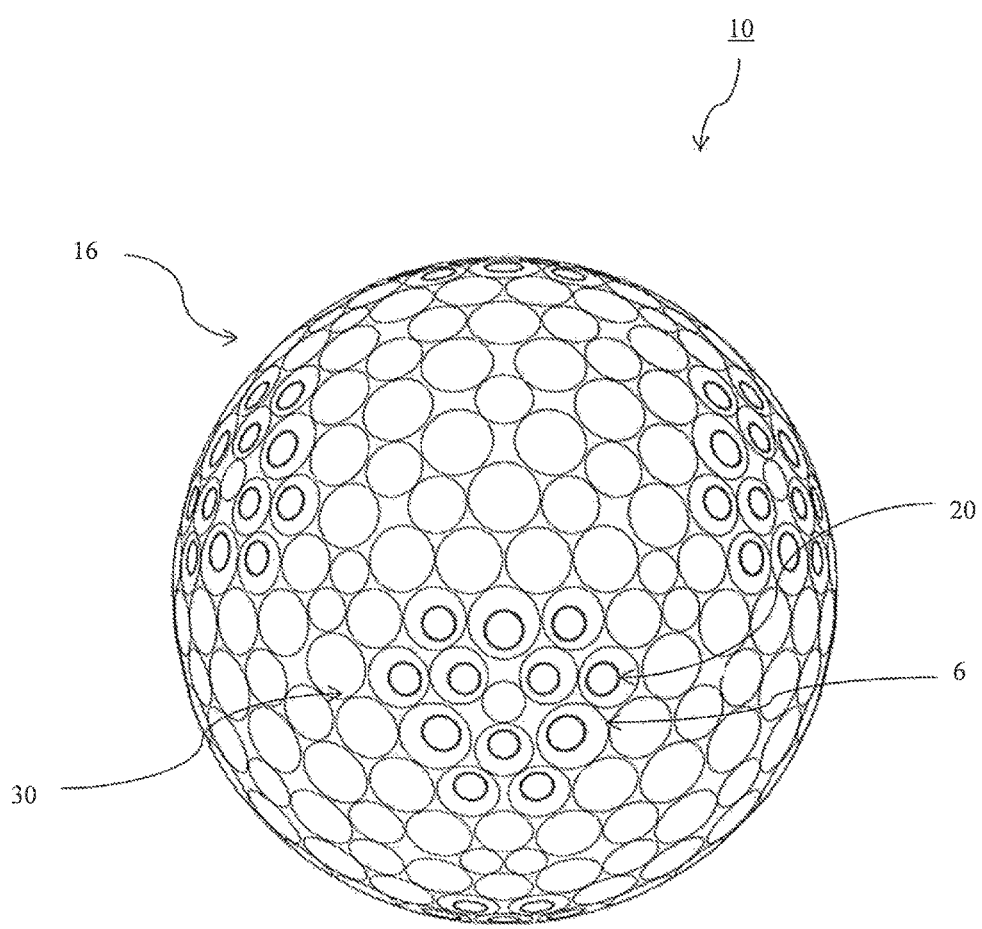
FIG. 12 illustrates a dimple pattern of a golf ball created in accordance with one embodiment of the present invention.
Figure 13:
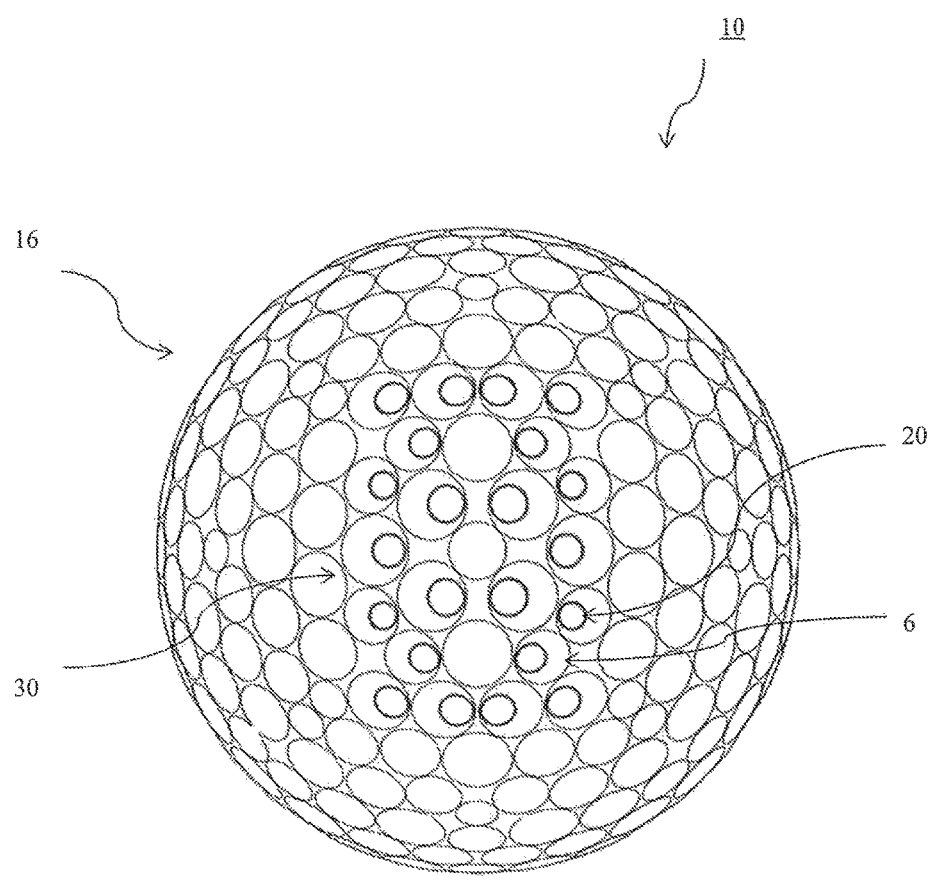
FIG. 13 illustrates a dimple pattern of a golf ball created in accordance with another embodiment of the present invention.
Figure 14:
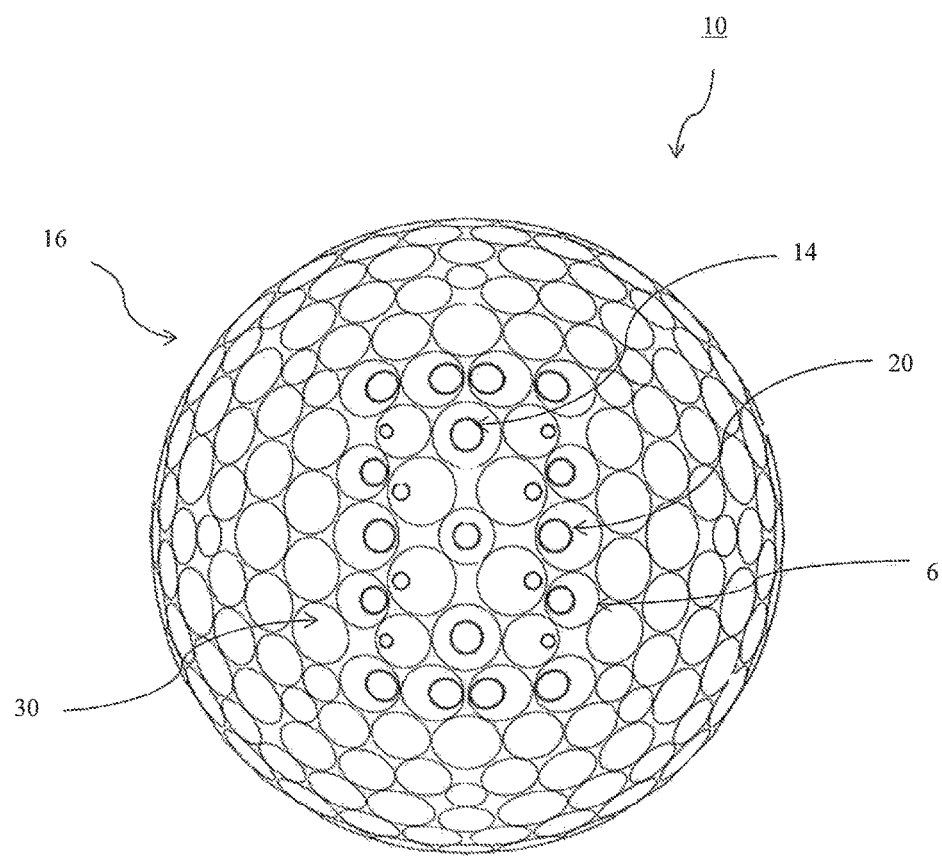
FIG. 14 illustrates a dimple pattern of a golf ball created in accordance with still another embodiment of the present invention.

FIGS. 12-14 also demonstrate various dimple patterns created in accordance with the present invention. FIG. 12 shows a dimple pattern 16 having multiple groups of non-concentric grooved dimples shifted in an axial preferential direction. As shown in FIG. 12, each dimple group 30 includes numerous dimples 6 having non-concentric grooves 20 shifted towards a center axis. In this aspect, the pattern of non-concentric grooved dimples in each group 30 is repeated several times around the golf ball 10 such that there are several groups of dimples, each group having non-concentric groove dimples shifted toward multiple symmetrical axes corresponding to the dimple pattern.

FIG. 13 shows a dimple pattern 16 having a group of non-concentric grooved dimples shifted in a planar preferential direction. As shown in FIG. 13, the dimple group 30 includes numerous dimples 6 having non-concentric grooves 20 shifted towards a center plane. In this aspect, the pattern of non-concentric grooved dimples in the group 30 appears once on the golf ball 10; however, the pattern may be repeated around the golf ball 10.

FIG. 14 shows a dimple pattern 16 having a group of concentric grooved dimples and non-concentric grooved dimples shifted in a planar preferential direction. As shown in FIG. 14, the dimple group 30 includes numerous dimples 6 having concentric grooves 14, non-concentric grooves 20 shifted towards a center plane, and non-concentric grooves 20 shifted away from a center plane. The pattern of concentric grooved dimples and non-concentric grooved dimples in the group 30 appears once on the golf ball 10; however, the pattern may be repeated around the golf ball 10.

While the present invention is not limited by any particular dimple pattern, dimples having at least one concentric groove or at least one non-concentric groove according to the present invention may be arranged along parting lines or equatorial lines, in proximity to the poles, or along the outlines of a geodesic or polyhedron pattern. Conventional dimples, or those dimples that do not include the concentric or non-concentric groove, may occupy the remaining spaces. The reverse arrangement is also suitable. Suitable dimple patterns include, but are not limited to, polyhedron-based patterns (e.g., tetrahedron, icosahedron, octahedron, dodecahedron, icosidodecahedron, cuboctahedron, and triangular dipyramid), phyllotaxis-based patterns, spherical tiling patterns, and random arrangements.

The dimple patterns of the present invention may be of any count. In one embodiment, the dimple count ranges from about 300 to about 500. In another embodiment, the dimple count is about 302. In still another embodiment, the dimple count is about 328. In yet another embodiment, the dimple count is about 352. In still another embodiment, the dimple count is about 376. In addition, the dimple pattern may include any number of dimple sizes. In one embodiment, the number of dimple sizes range from about 1 to about 30. In another embodiment, the number of dimple sizes range from about 5 to about 20.

In this aspect, the dimple pattern may include about 302 dimples in five sizes. In another embodiment, the dimple pattern may include about 312 dimples in five sizes. In still another embodiment, the dimple pattern may include about 328 dimples in seven sizes. In yet another embodiment, the dimple pattern may include about 352 dimples in five sizes. In still another embodiment, the dimple pattern may include about 376 dimples in eight sizes.

Golf Ball Construction

The grooves of the present invention may be added to the dimples at any point during the construction of the golf ball. In one embodiment, the groove may be added at the tooling stage by milling or burning the groove into the dimples of a dimple pattern. In this aspect, the resulting dimple pattern forms the interior surface of the cavity of a golf ball mold, which can then be used in an injection molding or compression molding process to form a cover layer comprising the golf ball dimple pattern. In another embodiment, the groove may be added after the molding process. In this aspect, the grooves may be added to the dimples by creating indentations in a molded or finished golf ball.

The dimples of the present invention may be used with practically any type of ball construction. For instance, the golf ball may have a two-piece design, a double cover, or two-component dual core construction depending on the type of performance desired of the ball. Other suitable golf ball constructions include solid, wound, liquid-filled, and/or dual cores, and multiple intermediate layers.

Different materials may be used in the construction of the golf balls made with the present invention. For example, the cover of the ball may be made of a thermoset or thermoplastic, a castable or non-castable polyurethane and polyurea, an ionomer resin, balata, or any other suitable cover material known to those skilled in the art. Conventional and non-conventional materials may be used for forming core and intermediate layers of the ball including polybutadiene and other rubber-based core formulations, ionomer resins, highly neutralized polymers, and the like.

The golf balls of the invention may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

EXAMPLES

The following non-limiting examples demonstrate golf ball dimples made in accordance with the present invention. The examples are merely illustrative of the preferred embodiments of the present invention, and are not to be construed as limiting the invention, the scope of which is defined by the appended claims.

Example 1

The following example illustrates various grooved dimples contemplated by the present invention. In particular, Table 1 provides spherical grooved dimples with varying edge angles and surface coverage (S) where the ratio of $$\frac{S \cdot N}{4\pi R^2 P}$$

is 0.01. The measurements in Table 1 apply to both concentric and non-concentric grooved dimples. N represents the number of grooved dimples on the golf ball, S is equal to the average surface area for all grooves on the ball, P is the surface coverage of the dimple pattern used on the ball, and R is the radius of the ball.

TABLE 1

Spherical Dimples Having Ratio of 0.010

| Edge Angle (°) | Surface Coverage (P) | $4\pi R^2 P$ | Ball Radius (R) | Total Groove Surface Area (S × N) |
|---|---|---|---|---|
| 13 | 0.847 | 7.5102 | 0.84 | 0.075102 |
| 13 | 0.827 | 7.3329 | 0.84 | 0.073329 |
| 13 | 0.804 | 7.1289 | 0.84 | 0.071289 |
| 14 | 0.847 | 7.5102 | 0.84 | 0.075102 |
| 14 | 0.827 | 7.3329 | 0.84 | 0.073329 |
| 14 | 0.804 | 7.1289 | 0.84 | 0.071289 |
| 15 | 0.847 | 7.5102 | 0.84 | 0.075102 |
| 15 | 0.827 | 7.3329 | 0.84 | 0.073329 |
| 15 | 0.804 | 7.1289 | 0.84 | 0.071289 |

Example 2

Figure 15:
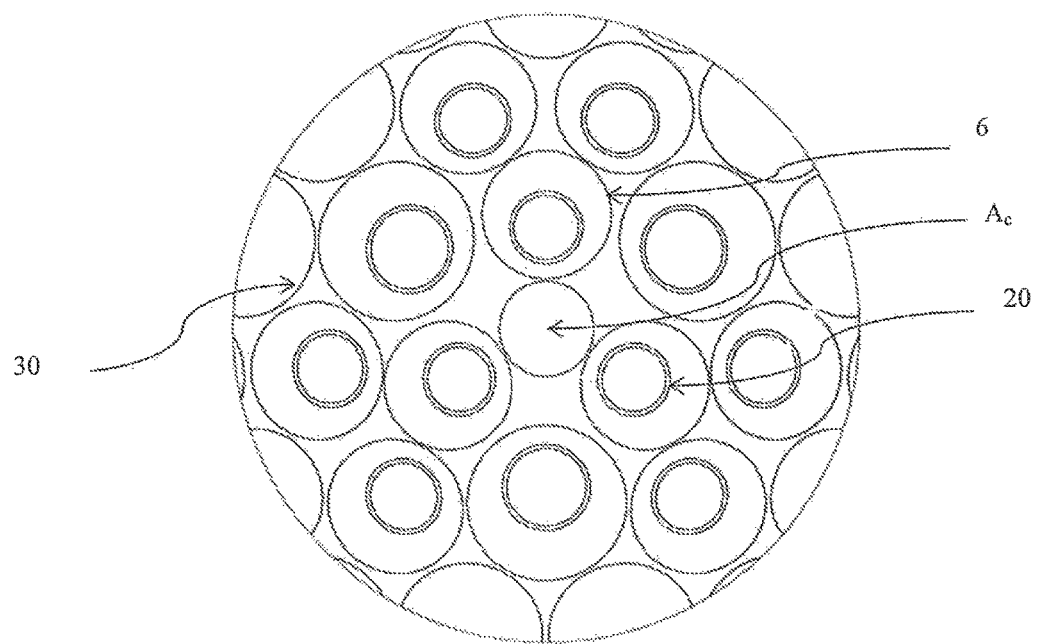
FIG. 15 illustrates an example of a group of non-concentric grooved dimples according to one embodiment of the present invention.

FIG. 15 presents one example of a group of non-concentric grooved dimples according to one embodiment of the present invention. More specifically, FIG. 15 shows an enlarged view of a group of dimples having non-concentric grooves that may be used on a golf ball, for example, in a golf ball dimple pattern exemplified in FIG. 12. As shown in FIG. 15, the group 30 is composed of 12 dimples, each of the dimples 6 have non-concentric grooves 20 shifted in an axial preferential direction. All of the non-concentric grooves 20 are shifted toward a center axis $A_c$.

In this non-limiting example, the non-concentric grooves 20 have a groove diameter D2 equal to about one half of the dimple diameter D1 and a groove width W of about 0.005 inches. For each of the dimples, the distance between the centroid of the dimple C2 and the centroid of the groove C1 is about 10 percent of the dimple diameter D1, which qualifies each of the grooves as non-concentric.

Example 3

Figure 16:
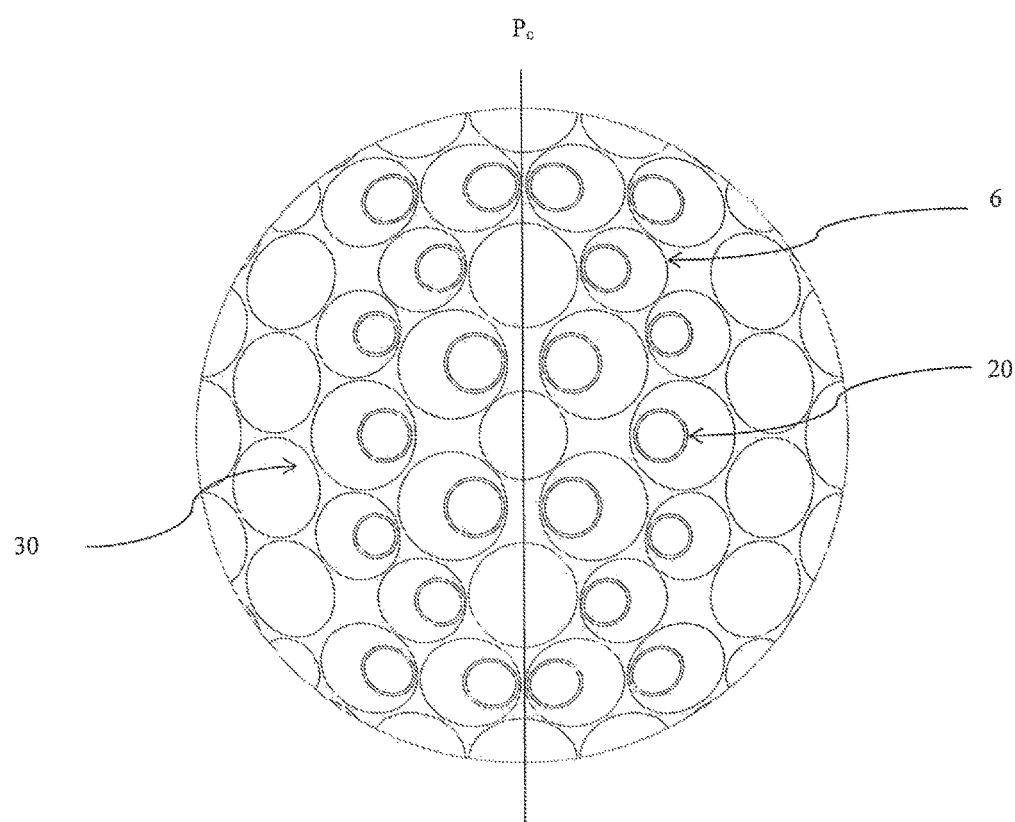
FIG. 16 illustrates an example of a group of non-concentric grooved dimples according to another embodiment of the present invention.

FIG. 16 presents another example of a group of non-concentric grooved dimples according to one embodiment of the present invention. More specifically, FIG. 16 shows an enlarged view of a group of dimples having non-concentric grooves that may be used on a golf ball, for example, in a golf ball dimple pattern exemplified in FIG. 13. As shown in FIG. 16, the group 30 is composed of 22 dimples, each of the dimples 6 have non-concentric grooves 20 shifted in a planar preferential direction. All of the non-concentric grooves 20 are shifted toward a center plane P.

In this non-limiting example, the non-concentric grooves 20 have a groove diameter D2 equal to about one half of the dimple diameter D1 and a groove width W of about 0.005 inches. For each of the dimples, the distance between the centroid of the dimple C2 and the centroid of the groove C1 is about 10 percent of the dimple diameter D1, which qualifies each of the grooves as non-concentric.

Example 4

Figure 17:
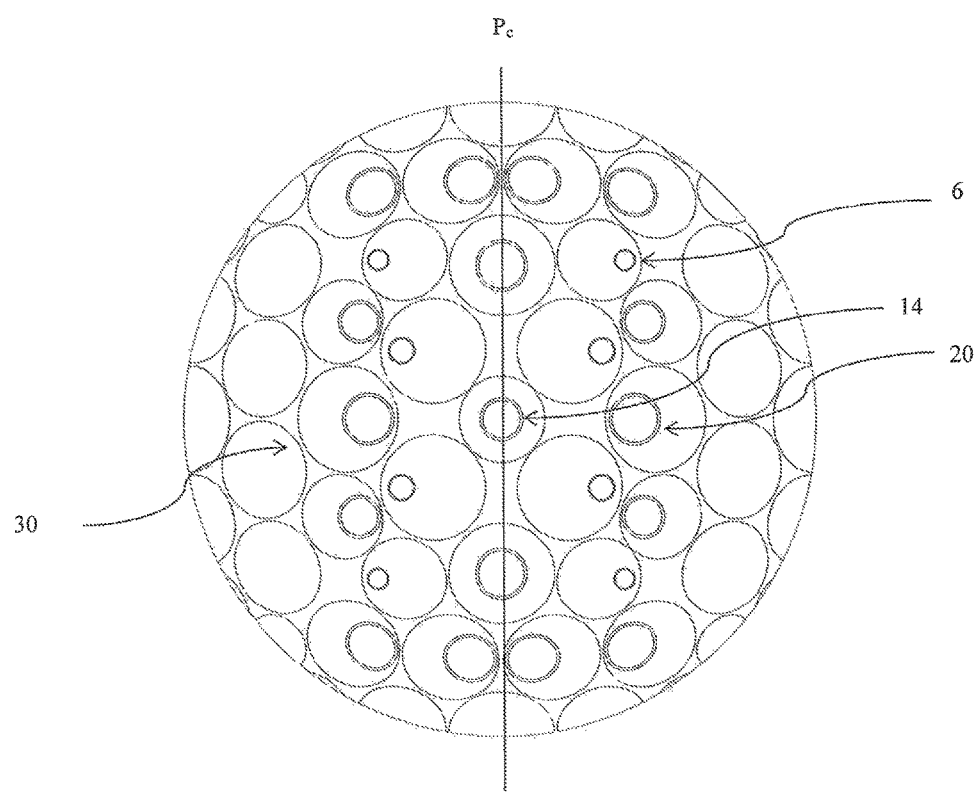
FIG. 17 illustrates an example of a group of non-concentric and concentric grooved dimples according to one embodiment of the present invention.

FIG. 17 presents yet another example of a group of non-concentric grooved dimples according to one embodiment of the present invention. More specifically, FIG. 17 shows an enlarged view of a group of dimples having both concentric grooves and non-concentric grooves that may be used on a golf ball, for example, in a golf ball dimple pattern exemplified in FIG. 14. As shown in FIG. 17, the group 30 is composed of 25 dimples, three of the dimples have concentric grooves 14 and 22 of the dimples have non-concentric grooves 20 shifted in a planar preferential direction. The concentric grooves 14 are centered on a center plane $P_c$. The non-concentric grooves 20 are a combination of grooves shifted toward the center plane $P_c$ and away from the center plane $P_c$.

In this non-limiting example, the concentric grooves 14 have a groove diameter D2 equal to about one half of the dimple diameter D2 and a groove width W of about 0.005 inches. The non-concentric groves 20 shifted toward the center plane $P_c$ have a groove diameter D2 equal to about one half of the dimple diameter D1 and a groove width W of about 0.005 inches. For each of the dimples having non-concentric grooves 20 shifted toward the center plane $P_c$, the distance between the centroid of the dimple C2 and the centroid of the groove C1 is about 10 percent of the dimple diameter D1, which qualifies each of the grooves as non-concentric. The non-concentric grooves 20 shifted away from the center plane $P_c$ have a groove diameter D2 equal to about one quarter of the dimple diameter D1 and a groove width W of about 0.0025 inches. For each of the dimples having non-concentric grooves 20 shifted away from the center plane $P_c$, the distance between the centroid of the dimple C2 and the centroid of the groove C1 is about 30 percent of the dimple diameter D1, which qualifies each of the grooves as non-concentric.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. A golf ball having a substantially spherical surface, comprising:
    a plurality of dimples arranged in a dimple pattern on the spherical surface, wherein:
        the plurality of dimples comprises dimples having a circular plan shape,
        at least a portion of the plurality of dimples comprise a circular non-concentric groove on each dimple surface,
        the golf ball has a ratio of surface area of the grooves on the golf ball to total surface area of the golf ball that is replaced by the plurality of dimples of about 0.010 or less,
        each circular non-concentric groove has a groove diameter and each dimple has a dimple diameter, and a ratio of groove diameter to dimple diameter is about 0.05 to about 0.95.

2. The golf ball of claim 1, wherein at least two dimples in the portion of dimples have one circular non-concentric groove in each dimple with a planar preferential direction.

3. The golf ball of claim 1, wherein at least two dimples in the portion of dimples have one circular non-concentric groove in each dimple with an axial preferential direction.

4. The golf ball of claim 1, wherein each non-concentric groove has a groove diameter and a first centroid and each dimple has a dimple diameter and a second centroid, and wherein a distance between the first centroid and the second centroid is at least 5 percent of the dimple diameter.

5. A golf ball having a substantially spherical surface, comprising:
    a plurality of dimples arranged in a dimple pattern on the spherical surface, wherein:
        the plurality of dimples comprises dimples having a circular plan shape,
        at least a portion of the plurality of dimples comprises (i) at least two dimples, each dimple having on the surface thereof one circular non-concentric groove with a planar preferential direction, or (ii) at least two dimples, each dimple having on the surface thereof one circular non-concentric groove with an axial preferential direction, or (iii) a combination of (i) and (ii), and
    a ratio of $$\frac{S \cdot N}{4\pi R^2 P}$$

is about 0.01 or less, wherein S is the average surface area for all grooves on the ball, N is the number of grooved dimples on the ball, R is the radius of the ball, and P is the surface coverage of the dimple pattern; and
each circular non-concentric groove has a groove diameter and a first centroid, each dimple has a dimple diameter and a second centroid, and a distance between the first centroid and the second centroid is at least 5 percent of the dimple diameter.

6. The golf ball of claim 5, wherein each non-concentric groove has a groove diameter and each dimple has a dimple diameter, and wherein a ratio of groove diameter to dimple diameter is about 0.05 to about 0.95.

7. The golf ball of claim 5, wherein the plurality of dimples comprises at least two dimples, each dimple having on the surface thereof one circular non-concentric groove with an axial preferential direction, wherein the non-concentric grooves with an axial preferential direction are shifted relative to a symmetrical axis of the dimple pattern.

8. The golf ball of claim 5, wherein the plurality of dimples comprises at least two dimples, each dimple having on the surface thereof one circular non-concentric groove with a planar preferential direction, wherein the non-concentric grooves with a planar preferential direction are shifted relative to a symmetrical plane of the dimple pattern.

9. The golf ball of claim 5, wherein the plurality of dimples comprises at least two dimples, each dimple having on the surface thereof one circular non-concentric groove with an axial preferential direction, wherein the dimples having non-concentric grooves with an axial preferential direction are symmetrically arranged about a reference axis.

10. The golf ball of claim 5, wherein the plurality of dimples comprises at least two dimples, each dimple having on the surface thereof one circular non-concentric groove with a planar preferential direction, wherein the dimples having non-concentric grooves with a planar preferential direction are symmetrically arranged about a reference plane.

11. The golf ball of claim 5, wherein the portion of the plurality of dimples comprises multiple groups of at least two dimples having on the surface thereof one non-concentric groove with an axial preferential direction.

12. The golf ball of claim 11, wherein each group is shifted relative to a different symmetrical axis of the dimple pattern.

13. A golf ball having a substantially spherical surface, comprising:
a plurality of dimples arranged in a dimple pattern on the spherical surface, wherein:
the plurality of dimples comprises dimples having a circular plan shape,
at least a portion of the plurality of dimples include one or more dimples having a circular concentric groove and two or more dimples having a circular non-concentric groove, and
a ratio of $$\frac{S \cdot N}{4\pi R^2 P}$$

is about 0.01 or less, wherein S is the average surface area for all grooves on the ball, N is the number of grooved dimples on the ball, R is the radius of the ball, and P is the surface coverage of the dimple pattern; and
each circular concentric groove and each circular non-concentric groove has a groove diameter and each dimple has a dimple diameter, and a ratio of each groove diameter to dimple diameter is about 0.05 to about 0.95.

14. The golf ball of claim 13, wherein each non-concentric groove has a groove diameter and a first centroid and each dimple has a dimple diameter and a second centroid, and wherein a distance between the first centroid and the second centroid is at least 10 percent of the dimple diameter.

* * * * *